United States Patent
Tsuchiya et al.

(10) Patent No.: US 8,903,133 B2
(45) Date of Patent: Dec. 2, 2014

(54) PERIODIC STATIONARY OBJECT DETECTION SYSTEM AND PERIODIC STATIONARY OBJECT DETECTION METHOD

(75) Inventors: Chikao Tsuchiya, Yokohama (JP); Yasuhisa Hayakawa, Yokohama (JP); Shinya Tanaka, Zama (JP); Hiroyuki Furushou, Atsugi (JP); Osamu Fukata, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 63 days.

(21) Appl. No.: 13/821,918

(22) PCT Filed: Feb. 17, 2012

(86) PCT No.: PCT/JP2012/053834
§ 371 (c)(1),
(2), (4) Date: May 16, 2013

(87) PCT Pub. No.: WO2012/115009
PCT Pub. Date: Aug. 30, 2012

(65) Prior Publication Data
US 2013/0322688 A1    Dec. 5, 2013

(30) Foreign Application Priority Data

Feb. 21, 2011    (JP) ................. P2011-034097

(51) Int. Cl.
*G06K 9/00*    (2006.01)
*H04N 7/18*    (2006.01)
*G08G 1/16*    (2006.01)
*G06K 9/50*    (2006.01)
*G06T 7/20*    (2006.01)

(52) U.S. Cl.
CPC ............ *G06K 9/00791* (2013.01); *G08G 1/167* (2013.01); *G06K 9/50* (2013.01); *G06T 7/2033* (2013.01); *G06T 2207/30252* (2013.01)
USPC ............................ 382/104; 348/143; 382/103

(58) Field of Classification Search
CPC .................. B60R 2300/607; B60R 2300/303; B60R 2300/105; B60R 2300/8093; B60R 2300/301; B60R 2300/102; B60R 2300/802; B60R 2300/304; H04N 2201/3253; H04N 13/0468; H04N 1/00323; H04N 2101/00; H04N 13/0018; H04N 13/0278; H04N 13/0484; G06T 19/003; G06T 17/00; G06T 7/004; G06T 7/2093; G06T 19/20; G06T 2207/30232; G06T 7/0038; G06T 7/2033; G06T 2207/30252; G06Q 50/265; G08G 1/16; G08G 1/168; G08G 1/166; G08G 1/14; G08G 1/167; G06F 3/0312; G06K 9/00791; G06K 9/51

See application file for complete search history.

(56) References Cited

U.S. PATENT DOCUMENTS 5,963,664 A * 10/1999 Kumar et al. ............... 382/154
(Continued)

FOREIGN PATENT DOCUMENTS

JP    2007-129560 A    5/2007
JP    2007-280132 A    10/2007
(Continued)

*Primary Examiner* — Manav Seth
(74) *Attorney, Agent, or Firm* — Foley & Lardner LLP

(57) ABSTRACT

A periodic stationary object detection system extracts a feature point of a three-dimensional object from image data on a predetermined region of a bird's eye view image for each of multiple sub regions included in the predetermined region, calculates waveform data corresponding to a distribution of the feature points in the predetermined region on the bird's eye view image, and judges whether or not the three-dimensional object having the extracted feature point is a periodic stationary object candidate on the basis of whether or not peak information of the waveform data is equal to or larger than a predetermined threshold value.

16 Claims, 18 Drawing Sheets

(56) References Cited

U.S. PATENT DOCUMENTS

| | | | |
|---|---|---|---|
| 6,172,601 B1* | 1/2001 | Wada et al. | 340/436 |
| 6,411,898 B2* | 6/2002 | Ishida et al. | 701/428 |
| 6,923,080 B1* | 8/2005 | Dobler et al. | 73/866.1 |
| 6,999,620 B1* | 2/2006 | Harville | 382/173 |
| 7,003,136 B1* | 2/2006 | Harville | 382/103 |
| 7,298,247 B2* | 11/2007 | Shimizu | 340/435 |
| 8,116,530 B2* | 2/2012 | Miyazaki | 382/106 |
| 8,229,173 B2* | 7/2012 | Kawakami | 382/107 |
| 8,503,713 B2* | 8/2013 | Ziemeck et al. | 382/100 |
| 2002/0110262 A1* | 8/2002 | Iida et al. | 382/104 |
| 2010/0231718 A1 | 9/2010 | Nakamori et al. | |

FOREIGN PATENT DOCUMENTS

| | | |
|---|---|---|
| JP | 2008-003941 A | 1/2008 |
| JP | 2009-266136 A | 11/2009 |
| JP | 2010-211701 A | 9/2010 |

* cited by examiner

PERIODIC STATIONARY OBJECT DETECTION SYSTEM AND PERIODIC STATIONARY OBJECT DETECTION METHOD

TECHNICAL FIELD

The present invention relates to a periodic stationary object detection system and a periodic stationary object detection method.

BACKGROUND ART

Heretofore, there has been proposed an object detection system, which creates a difference image from multiple captured images captured by a camera, and when the shape of a region where a difference is present in the difference image changes toward the principal axis of a direction in which the camera captures the images, judges that the difference shows a stationary three-dimensional object (see Patent Literature 1).

CITATION LIST

Patent Literature

Patent Literature 1: Japanese Patent Application Publication No. 2007-129560

SUMMARY OF INVENTION

Technical Problem

The object detection system described in Patent Literature 1 judges whether there is a stationary three-dimensional object alone. Hence, it has difficulty in distinguishing and recognizing stationary three-dimensional objects periodically present along a roadside, such as pylons, guardrail posts, or utility poles (hereinafter referred to as periodic stationary objects), from another three-dimensional object.

The present invention has been made to solve the above-described problem. An object of the present invention is to provide a periodic stationary object detection system and a periodic stationary object detection method, which enable high precision detection of periodic stationary objects.

Solution to Problem

An aspect of the present invention is a periodic stationary object detection system for detecting a periodic stationary object in surroundings of a moving object. The periodic stationary object detection system includes: an image-capturing device mounted on the moving object and capable of capturing an image of the surroundings of the moving object; a viewpoint converting unit configured to perform viewpoint conversion on the image captured by the image-capturing device to create a bird's eye view image; a feature point-extracting unit configured to extract a feature point of a three-dimensional object from image data on a predetermined region of the bird's eye view image for each of multiple sub regions included in the predetermined region; a waveform data-calculating unit configured to calculate waveform data corresponding to a distribution of the feature points extracted by the feature point-extracting unit in the predetermined region on the bird's eye view image; a peak information detecting unit configured to detect peak information of the waveform data; a periodic stationary object candidate-detecting unit configured to judge whether or not the three-dimensional object having the feature point extracted by the feature point-extracting unit is a periodic stationary object candidate on the basis of whether or not the peak information is equal to or larger than a predetermined first threshold value; and a periodic stationary object-judging unit configured to determine that the periodic stationary object candidate is a periodic stationary object when the periodic stationary object candidate is detected by the periodic stationary object candidate-detecting unit and the detection is made under a predetermined condition.

Another aspect of the present invention is a periodic stationary object detection method for detecting periodic stationary objects in surroundings of a moving object. The periodic stationary object detection method includes: an image-capturing step of capturing an image of the surroundings of the moving object using an image-capturing device mounted on the moving object; a viewpoint converting step of performing viewpoint conversion on the image captured by the image-capturing device to create a bird's eye view image; a feature point-extracting step of extracting a feature point of a three-dimensional object from image data on a predetermined region of the bird's eye view image for each of multiple sub regions included in the predetermined region; a waveform data-calculation step of calculating waveform data corresponding to a distribution of the feature points extracted in the feature point-extracting step in the predetermined region on the bird's eye view image; a peak information-detecting step of detecting peak information of the waveform data; a periodic stationary object candidate-detecting step of judging whether or not the three-dimensional object having the feature point extracted in the feature point-extracting step is a periodic stationary object candidate on the basis of whether or not the peak information is equal to or larger than a predetermined first threshold value; and a periodic stationary object-judging step of determining that the periodic stationary object candidate is a periodic stationary object when the periodic stationary object candidate is detected in the periodic stationary object candidate-detecting step and the detection is made under a predetermined condition.

DESCRIPTION OF EMBODIMENTS

First Embodiment

Figure 1:
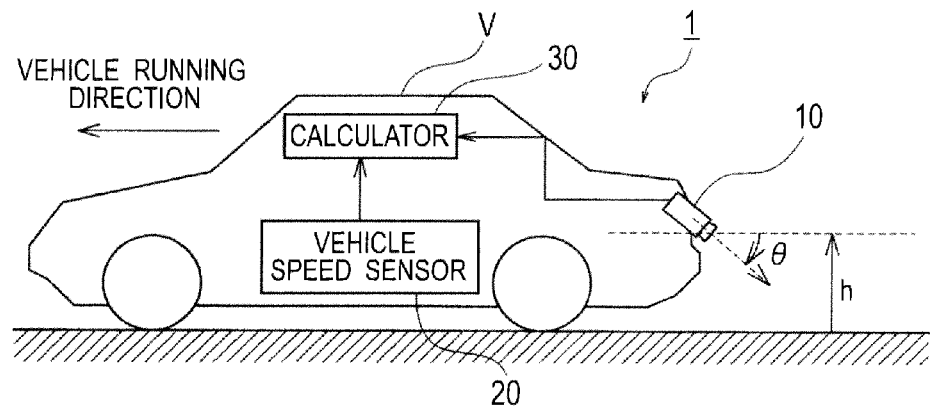
FIG. 1 is a schematic configuration diagram of a periodic stationary object detection system according to a first embodiment of the present invention, illustrating an example where the periodic stationary object detection system is mounted on a vehicle.

Hereinafter, preferred embodiments of the present invention will be described based on the drawings. FIG. 1 is a schematic configuration diagram of a periodic stationary object detection system 1 according to a first embodiment of the present invention, illustrating an example where the periodic stationary object detection system 1 is mounted on an own vehicle V. The periodic stationary object detection system 1 shown in FIG. 1 is configured to detect periodic stationary objects in surroundings of the own vehicle V, and specifically detect stationary objects periodically present along a roadside, such as pylons, guardrail posts, or utility poles. Incidentally, in the following examples, the own vehicle V will be described as an example of a moving object. However, the moving object is not limited to the own vehicle V, and may be any other moving object such as a motorcycle or a bicycle.

The periodic stationary object detection system 1 includes a camera (image-capturing device) 10, a vehicle speed sensor 20 (speed detector), and a calculator 30. The camera 10 shown in FIG. 1 is installed at a position at a height h and a rear part of the own vehicle V in such a manner that an optical axis thereof forms a downward angle θ relative to a horizontal line. The camera 10 is configured to capture an image of a predetermined detection region from this position. The vehicle speed sensor 20 is configured to detect a running speed of the own vehicle V and calculate a speed from a wheel speed detected by a wheel speed sensor provided on a wheel to detect the number of revolutions, for example. The calculator 30 is configured to detect a periodic stationary object in surroundings of the own vehicle V on the basis of an image captured by the camera 10 and a signal from the vehicle speed sensor 20.

Figure 2:
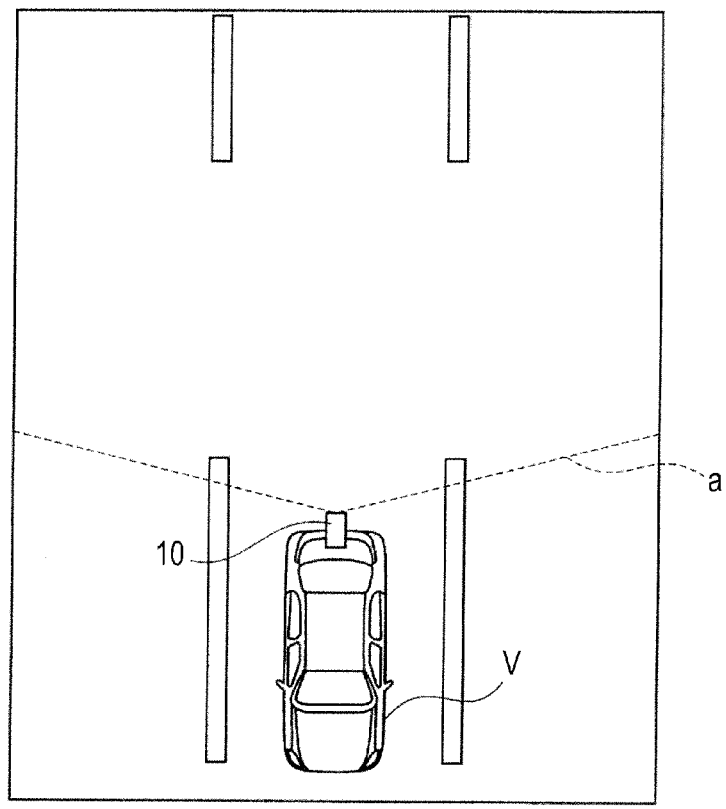
FIG. 2 is a top view for illustrating a running state of the own vehicle shown in FIG. 1.

FIG. 2 is a top view for illustrating a running state of the own vehicle V shown in FIG. 1. As shown in FIG. 2, the camera 10 captures an image of an area behind the vehicle at a predetermined view angle a. In this event, the camera 10 has a wide view angle a, and is capable of capturing an image of a lane where the own vehicle V is running as well as a roadside where a periodic stationary object is present.

Figure 3:
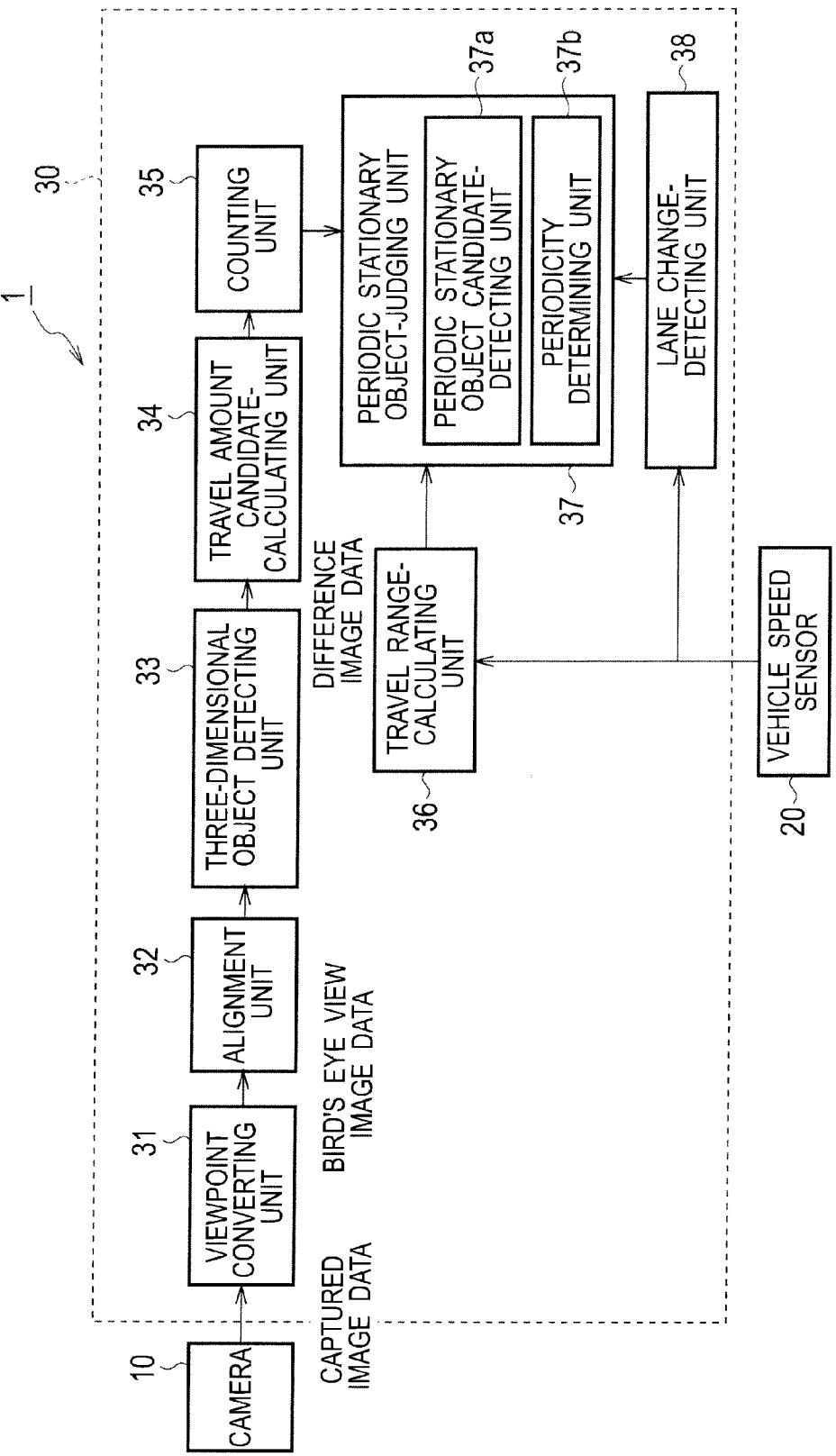
FIG. 3 is a block diagram for illustrating the details of a calculator shown in FIG. 1.

FIG. 3 is a block diagram for illustrating the details of the calculator 30 shown in FIG. 1. Note that, in FIG. 3, the camera 10 and the vehicle speed sensor 20 are also illustrated in order to clarify the relation of connection.

As shown in FIG. 3, the calculator 30 includes a viewpoint converting unit 31, an alignment unit 32, a three-dimensional object detecting unit 33, a travel amount candidate-calculating unit 34, a counting unit 35, a travel range-calculating unit 36, a periodic stationary object-judging unit 37, and a lane change-detecting unit (lateral movement-detecting unit) 38.

The viewpoint converting unit 31 is configured to receive captured image data obtained through the capturing by the camera 10 and to perform viewpoint conversion to convert the received captured image data to bird's eye view image data on a state of being viewed from bird's eyes. The state of being viewed from bird's eyes refers to a state of being viewed from a virtual camera that looks, for example, vertically downward from the sky. Such viewpoint conversion is performed as described in, for example, Patent Literature 1.

Figure 4:
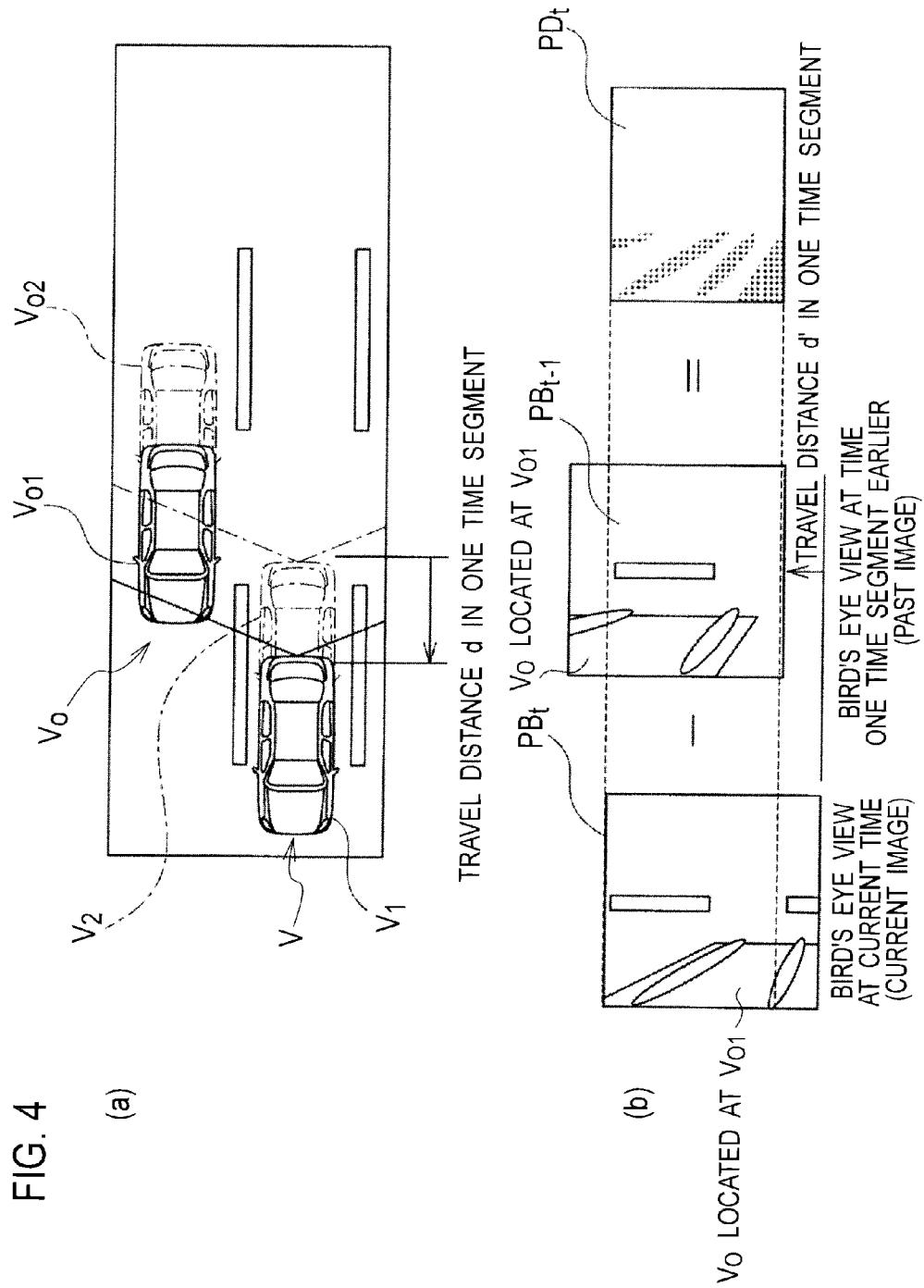
FIG. 4 shows top views for illustrating an overview of processing by an alignment unit shown in FIG. 3; (a) illustrates a traveling state of the own vehicle; and (b) illustrates an overview of alignment.

The alignment unit 32 is configured to sequentially receive bird's eye view image data obtained through the viewpoint conversion by the viewpoint converting unit 31, and to align positions of the received bird's eye view image data at different times. FIG. 4 shows top views for illustrating an overview of processing by the alignment unit 32 shown in FIG. 3; (a) illustrates a traveling state of the own vehicle V, and (b) illustrates an overview of alignment.

As shown in FIG. 4(a), suppose that the own vehicle V at a current time is located at $V_1$ and has been located at $V_2$ at a time one time segment earlier. Moreover, another vehicle $V_O$ is located in a region sideways behind the own vehicle V and running parallel to the own vehicle V, supposing that the other vehicle $V_O$ at a current time is located at $V_{O1}$ and has been located at $V_{O2}$ at a time one time segment earlier. Further, the own vehicle V is assumed to have moved a distance d in the one time segment. Note that the time one time segment earlier may be a time a predetermined time period (for example, one control cycle) before the current time, or may be a time an arbitrary time period before the current time.

In such a state, a bird's eye view image $PB_t$ at the current time is as shown in FIG. 4(b). In the bird's eye view image $PB_t$, a white line drawn on a road has a rectangular shape and is in a state of being relatively accurately viewed from the above. Meanwhile, the other vehicle $V_O$ located at $V_{O1}$ s inclined. Moreover, in a bird's eye view image $Pa_{t-1}$ at the time one time segment earlier also, the white line drawn on the road has a rectangular shape and in a state of being relatively accurately viewed from the above. However, the other vehicle $V_O$ located at $V_{O2}$ is inclined.

The alignment unit 32 brings the bird's eye view images $PB_t$, $PB_{t-1}$ as described above into alignment on data. In this event, the alignment unit 32 offsets the bird's eye view image $PB_{t-1}$ at the time one time segment earlier to coincide the position thereof with the position of the bird's eye view image $PB_t$ at the current time. An offset amount d' is an amount corresponding to the travel distance d shown in FIG. 4(a), and is determined on the basis of a signal from the vehicle speed sensor 20 and a time period from the time one time segment earlier to the current time.

The three-dimensional object detecting unit 33 is configured to detect multiple three-dimensional objects from data on a difference image $PD_t$. Specifically, the three-dimensional object detecting unit 33 finds out a difference between the bird's eye view images $PB_t$, $PB_{t-1}$, and creates data on the difference image $PD_t$. Here, a pixel value of the difference image $PD_t$ may be defined by finding an absolute value of a difference between pixel values of the bird's eye view images $PB_t$, $PB_{t-1}$, or may be defined as "1" when the absolute value exceeds a predetermined value and as "0" when not exceeding the predetermined value in order to deal with a change in an illuminance environment. Moreover, the three-dimensional object detecting unit 33 is configured to judge that three-dimensional objects are present in a region detected as "1" in the above manner on the data on the difference image $PD_t$.

Figure 5:
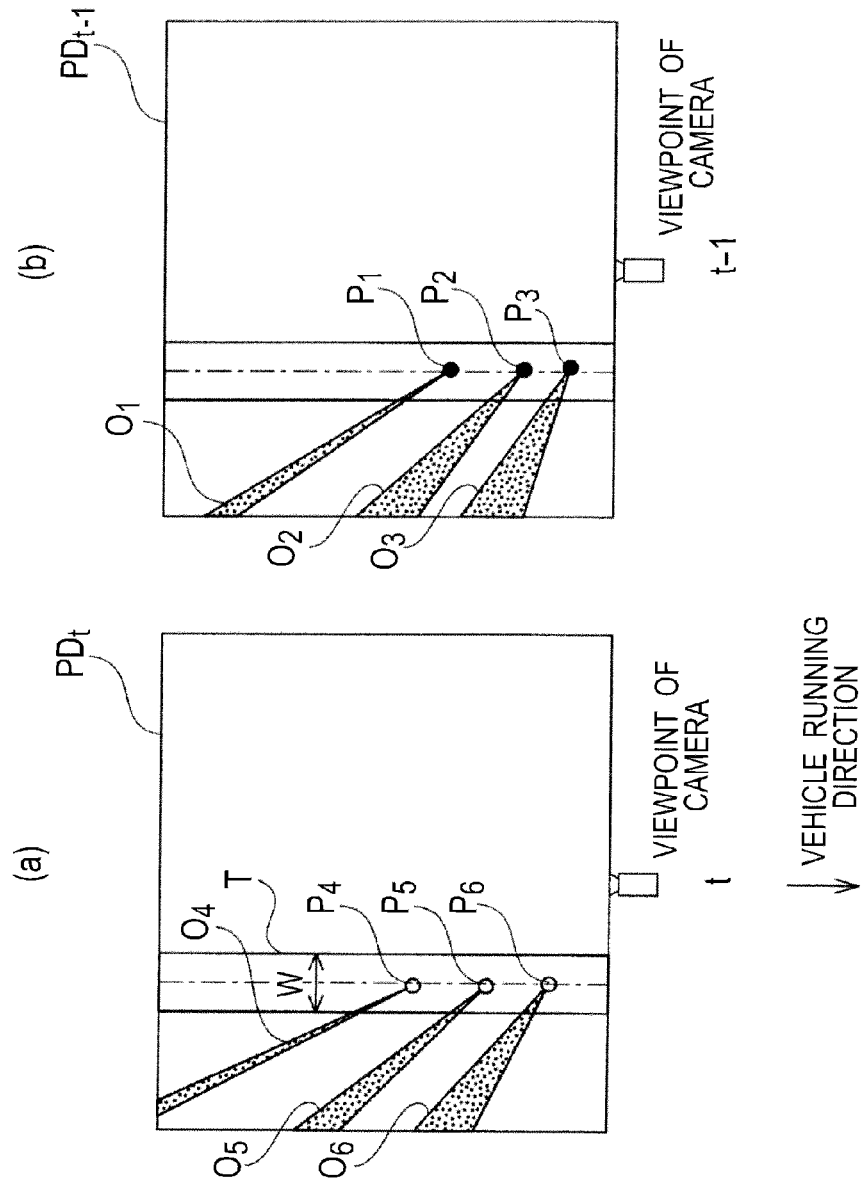
FIG. 5 shows views for illustrating the details of processing by a travel amount candidate-calculating unit shown in FIG. 3; (a) shows a difference image PD, at time t; and (b) shows a difference image $PD_{t-1}$ at time t−1.

Reference is made again to FIG. 3. The travel amount candidate-calculating unit 34 is configured to calculate travel amount candidates of the multiple three-dimensional objects detected by the three-dimensional object detecting unit 33. FIG. 5 shows views for illustrating details of processing by the travel amount candidate-calculating unit 34 shown in FIG. 3; (a) shows a difference image $PD_t$ at time t; and (b) shows a difference image $PD_{t-1}$ at time t−1.

First, the travel amount candidate-calculating unit 34 detects a grounding point (feature point) of a three-dimensional object from data on the difference image $PD_{t-1}$ at the time t−1 as shown in FIG. 5(b). The grounding point refers to a contact point between the three-dimensional object and the road. In this event, the travel amount candidate-calculating unit 34 detects, as a grounding point, the nearest position of the detected three-dimensional object to the camera 10 of the own vehicle V. The travel amount candidate-calculating unit 34 detects a grounding point in every region (sub region) having a three-dimensional object present on the data on the difference image $PD_{t-1}$, which is judged by the three-dimensional object detecting unit 33.

Specifically, the travel amount candidate-calculating unit 34 detects a grounding point $P_1$ for a three-dimensional object $O_1$, detects a grounding point $P_2$ for a three-dimensional object $O_2$, and detects a grounding point $P_3$ for a three-dimensional object $O_3$. Then, the travel amount candidate-calculating unit 34 sets a region T having a width W in the difference image $PD_t$ at the time t as shown in FIG. 5(a). In this event, the travel amount candidate-calculating unit 34 sets the regions T at positions corresponding to the grounding points $P_1$ to $P_3$ on the data on the difference image $PD_{t-1}$ at time t−1.

Next, the travel amount candidate-calculating unit 34 detects a grounding point of a three-dimensional object from the data on the difference image $PD_t$ at the time t. In this case also, the travel amount candidate-calculating unit 34 detects a grounding point in every region (sub region) having a three-dimensional object present on the data on the difference image $PD_t$, which is judged by the three-dimensional object detecting unit 33. The travel amount candidate-calculating unit 34 detects the nearest position of the detected three-dimensional object, as a grounding point, to the camera 10 of the own vehicle V. Specifically, the travel amount candidate-calculating unit 34 detects a grounding point $P_4$ for a three-dimensional object $O_4$, detects a grounding point $P_5$ for a three-dimensional object $O_5$, and detects a grounding point $P_6$ for a three-dimensional object $O_6$. In this manner, the alignment unit 32, the three-dimensional object detecting unit 33 and the travel amount candidate-calculating unit 34 function as a feature point-extracting unit configured to extract a feature point (grounding point) of a three-dimensional object from image data on a predetermined region of the bird's eye view image (image data on a rear lateral region of the difference image) for each of multiple sub regions (every region judged to have a three-dimensional object present on the image data on the difference image) included in the predetermined region.

Further, the travel amount candidate-calculating unit 34 links the grounding points to each other. Specifically, the travel amount candidate-calculating unit 34 links the grounding point $P_4$ to the grounding point $P_1$, links the grounding point $P_5$ to the grounding point $P_1$, and links the grounding point $P_6$ to the grounding point $P_1$. Similarly, the travel amount candidate-calculating unit 34 links the grounding points $P_4$ to $P_6$ to the grounding points $P_2$ and $P_3$.

Thereafter, the travel amount candidate-calculating unit 34 calculates distances (i.e., travel amount candidates) among the grounding points $P_1$ to $P_6$ thus linked. Then, the travel amount candidate-calculating unit 34 sets the calculated distances as travel amount candidates. In this manner, the travel amount candidate-calculating unit 34 calculates multiple travel amount candidates for each three-dimensional object. This prevents a trouble of erroneously calculating a travel amount of a periodic stationary object having similar image features appearing periodically as a result of solely determining the travel amount of the three-dimensional object.

Note that the reason why the region T is set is that even if an error occurs in aligning the bird's eye view images $PB_t$, $PB_{t-1}$ due to the pitching, yawing, and the like of the own vehicle V, the grounding points $P_1$ to $P_6$ are linked to each other stably. Additionally, the linking of the grounding points $P_1$ to $P_6$ is determined by a matching process on a luminance distribution around the grounding points of bird's eye view images $PB_t$, $PB_{t-1}$.

Reference is made again to FIG. 3. The counting unit 35 is configured to count the travel amount candidates calculated by the travel amount candidate-calculating unit 34, and a histogram (waveform data) is generated through the counting. For example, the counting unit 35 counts the value as "3" when a distance between the grounding point $P_1$ and the grounding point $P_4$, a distance between the grounding point $P_2$ and the grounding point $P_5$, and a distance between the grounding point $P_3$ and the grounding point $P_6$ are the same. In this manner, by counting the travel amount candidates and generating a histogram, the counting unit 35 functions as a waveform data-calculating unit configured to calculate waveform data (based on the relative positional relation of the grounding points) corresponding to the distribution of the grounding points in the rear lateral region of the difference image.

The travel range-calculating unit 36 is configured to calculate a travel range of a periodic stationary object on the bird's eye view image on the basis of a capturing interval of the camera 10 and a traveling speed of the own vehicle V detected by the vehicle speed sensor 20. More specifically, the travel range-calculating unit 36 calculates a travel range having a margin within a predetermined range for the speed of the own vehicle V. Here, the margin is for example ±10 km/h. More specifically, the travel range-calculating unit 36 calculates a speed of a three-dimensional object moving one pixel in one control cycle at approximately 5.5 km/h when the capturing interval of the camera 10 is 33 ms and the actual distance in a vehicle running direction covered by one pixel is 5 cm. In consideration that the precision of the bird's eye view images $PB_t$, $PB_{t-1}$ is deteriorated by the vehicle movement, the margin of ±10 km/h is necessary to make this approximately 5.5 km/h allowable.

The periodic stationary object-judging unit 37 is configured to judge whether or not the multiple three-dimensional objects detected by the three-dimensional object detecting unit 33 are periodic stationary objects. The periodic stationary object-judging unit 37 includes a periodic stationary object candidate-detecting unit 37a and a periodicity determining unit 37b. The periodic stationary object-judging unit 37 is configured to judge whether the multiple three-dimensional objects detected by the three-dimensional object detecting unit 33 are periodic stationary objects on the basis of the histogram generated by the counting unit 35, the travel range calculated by the travel range-calculating unit 36, periodic stationary object candidates (stationary objects that may be periodic stationary objects) detected by the periodic stationary object candidate-detecting unit 37a, and a periodicity determined by the periodicity determining unit 37b.

Figure 6:
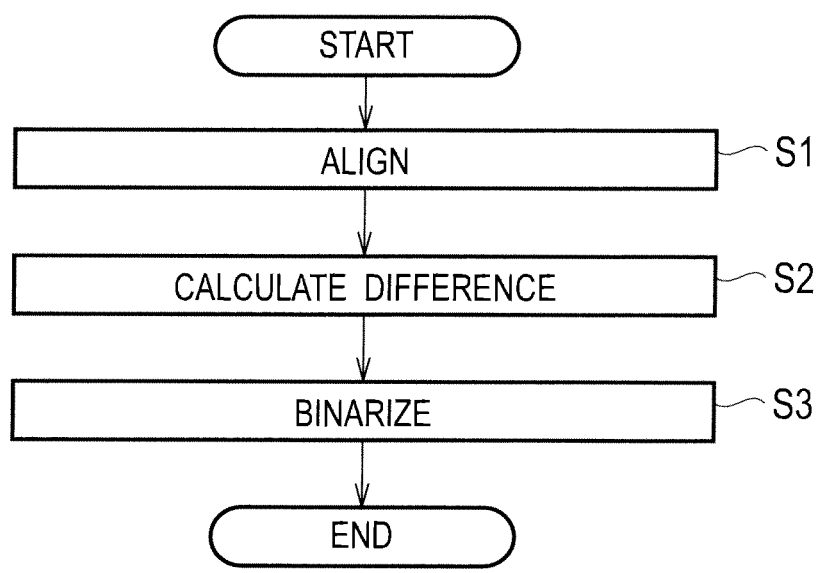
FIG. 6 is a flowchart for illustrating processings by the alignment unit and a three-dimensional object detecting unit shown in FIG. 3.

Next, a periodic stationary object detection method will be described with reference to flowcharts. FIG. 6 is a flowchart for illustrating processings by the alignment unit 32 and the three-dimensional object detecting unit 33 shown in FIG. 3. First, the alignment unit 32 receives data on the bird's eye view images $PB_t$, $PB_{t-1}$ at different times detected by the viewpoint converting unit 31 for the alignment (S1). Then, the three-dimensional object detecting unit 33 finds out a difference between the data on the bird's eye view images $PB_t$, $PB_{t-1}$ aligned in step S1 (S2). Thereafter, the three-dimensional object detecting unit 33 performs binarization on the basis of a predetermined value and creates data on the difference image $PD_t$ (S3). Thus, the processings by the alignment unit 32 and three-dimensional object detecting unit 33 are terminated.

Figure 7:
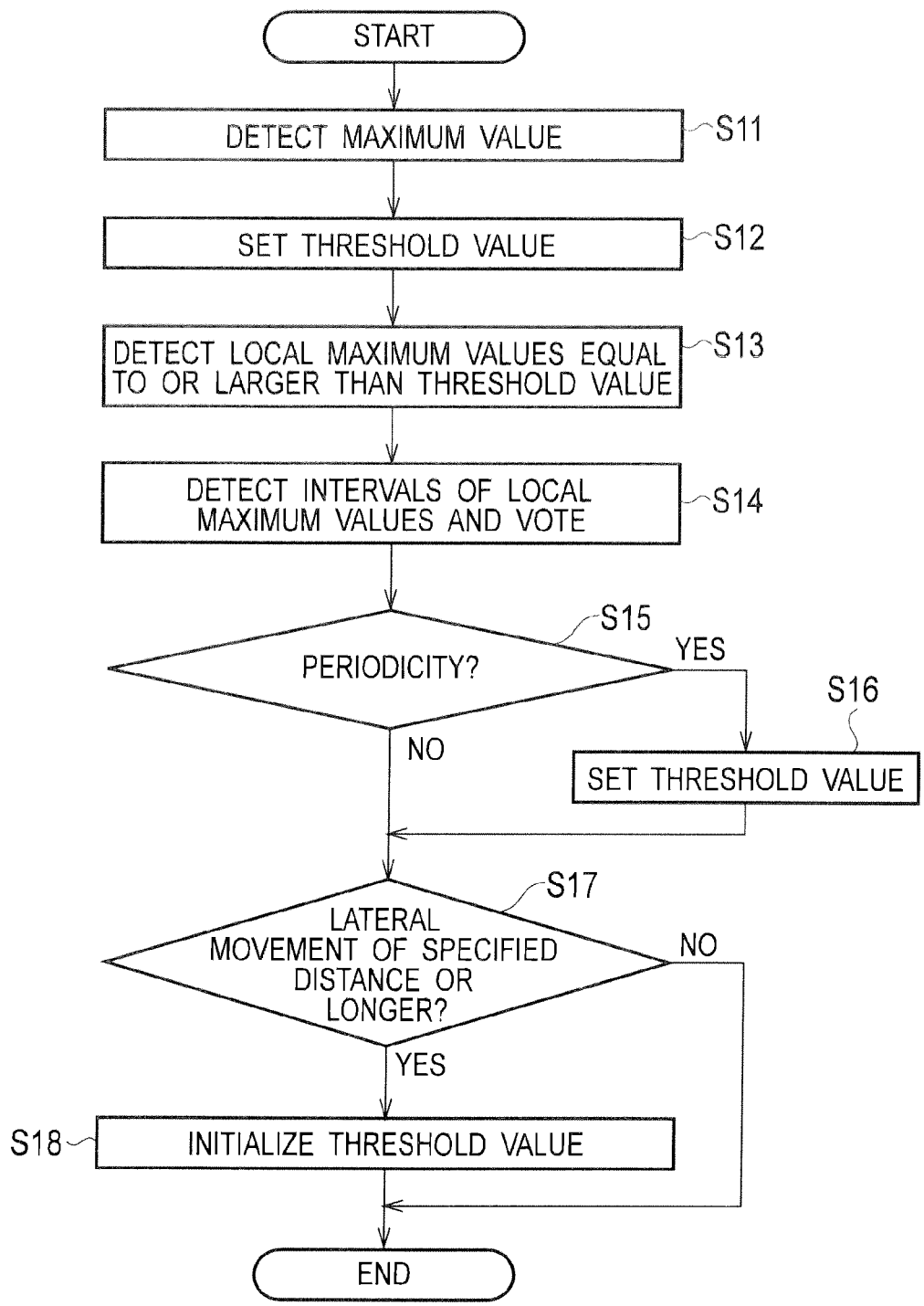
FIG. 7 is a flowchart for illustrating processing by a periodicity determining unit shown in FIG. 3.
Figure 8:
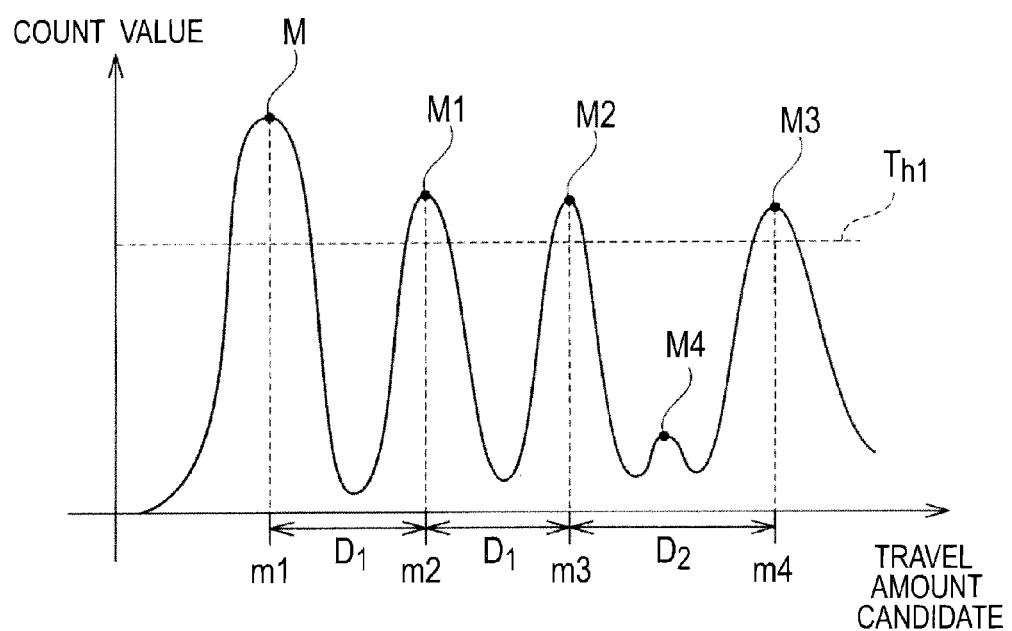
FIG. 8 is a graph showing a histogram generated by a counting unit shown in FIG. 3.

FIG. 7 is a flowchart for illustrating processings by the periodic stationary object candidate-detecting unit 37a and the periodicity determining unit 37b shown in FIG. 3. FIG. 8 is a graph for illustrating a histogram generated by the counting unit 35 shown in FIG. 3. As shown in FIG. 8, the counting unit 35 counts the same travel amount candidates calculated thereamong. Specifically, since multiple travel amounts m1, m2, m3, m4 are detected in the example shown in FIG. 8, these count values are high.

As shown in FIGS. 7 and 8, the periodic stationary object candidate-detecting unit 37a first detects a maximum value M (peak value; peak information) from the histogram (S11). Then, the periodic stationary object candidate-detecting unit 37a sets a predetermined threshold value $Th_1$ on the basis of the maximum value M detected in step S11 (S12). Here, the predetermined threshold value $Th_1$ is set to be 70% of the maximum value M. For example, when the count value of the maximum value M is "7", predetermined threshold value $Th_1$ is set to "4.9". Since the predetermined threshold value $Th_1$ is obtained from the maximum value M of the count values in this manner, it is possible to set an appropriate threshold value even if the size of the count values greatly changes due to the positional relation between the own vehicle V and three-dimensional objects, sunlight condition, or the like. Note that, in the present embodiment, the predetermined threshold value $Th_1$ is a value of 70% of the maximum value M, but not limited thereto.

Next, the periodic stationary object candidate-detecting unit 37a detects local maximum values M1 to M3 (peak values; peak information) equal to or larger than the predetermined threshold value $Th_1$ (S13). Here, when the maximum value M is for example "7", the periodic stationary object candidate-detecting unit 37a detects the local maximum values M1 to M3 having a count value of "5" or larger. In this manner, the periodic stationary object candidate-detecting unit 37a functions as a peak information detecting unit configured to detect the peak information of the histogram (waveform data). Further, the periodic stationary object candidate-detecting unit 37a judges whether or not the three-dimensional object having the detected grounding point is a periodic stationary object candidate on the basis of whether or not the peak information is equal to or larger than a predetermined threshold value. Specifically, for example, the periodic stationary object candidate-detecting unit 37a determines that three-dimensional objects linked to travel amount candidates corresponding to the local maximum values M and M1 to M3 (including the maximum value M) (for example, when a distance between certain two grounding points coincides with any one of the local maximum values M and M1 to M3, the three-dimensional objects are two three-dimensional objects having the grounding points) are periodic stationary object candidates.

Thereafter, the periodicity determining unit 37b detects intervals (peak information) of the local maximum values M and M1 to M3 (including the maximum value M), and casts a vote regarding the detected intervals (S14). Specifically, in the example shown in FIG. 8, the number of votes for an interval $D_1$ is "2", and the number of votes for an interval $D_2$ is "1".

Then, the periodicity determining unit 37b determines whether or not there is a periodicity (S15). In this event, the periodicity determining unit 37b determines a periodicity on the basis of whether or not the number of votes in step S14 is equal to or larger than a predetermined number of votes. Here, the predetermined number of votes is half of the number of three-dimensional objects detected from the bird's eye view image $PB_t$. Hence, when the number of three-dimensional objects detected from the bird's eye view image $PB_t$ is "4", the predetermined number of votes is "2". Note that the predetermined number of votes is not limited to the above and may be a fixed value.

When it is judged that there is a periodicity (S15: YES), the periodicity determining unit 37b lowers the predetermined threshold value $Th_1$ in step S12 (S16). Then, the processing advances to step S17. Hence, although the predetermined threshold value $Th_1$ has been, for example, 70% of the maximum value M, the predetermined threshold value $Th_1$ is set to be 60% of the maximum value M or other values. Moreover, the period during which the predetermined threshold value $Th_1$ is lowered is approximately around 1 second. Every time it is judged that there is a periodicity, the predetermined threshold value $Th_1$ is reset. In this manner, whether or not there is a periodicity is judged from the positions where the local maximum values M and M1 to M3 of the count values appear, that is, the intervals. When it is judged that there is a periodicity, the predetermined threshold value $Th_1$ is lowered. Accordingly, once a periodicity is judged, the judgment of periodic stationary objects can be facilitated. Meanwhile, until a periodicity is judged, the predetermined threshold value $Th_1$ is not lowered. This can prevent erroneous detection of three-dimensional objects due to alignment error or the like.

Meanwhile, when it is judged that there is no periodicity (S15: NO), the processing advances to step S17 without lowering the predetermined threshold value $Th_1$.

In this manner, the periodicity determining unit 37b judges if there is a periodicity from the number of votes (peak information) regarding the positions where the local maximum values M and M1 to M3 appear (interval), the local maximum values M and M1 to M3 being equal to or larger than the predetermined threshold value $Th_1$ based on the maximum value M of the count values of the travel amount candidates. This makes is possible to ignore a local maximum value, which is a relatively small value (for example, reference sign M4 in FIG. 8), and a periodicity can be judged further precisely with little influence from noise.

In step S17, the periodicity determining unit 37b judges whether or not the lane change-detecting unit 38 detects a lateral movement of a specified distance or longer (S17). Specifically, the lane change-detecting unit 38 judges that a lateral movement of the specified distance or longer is detected when a turn signal is on and a steering angle detected is equal to or higher than a specified angle determined from the vehicle speed detected by the vehicle speed sensor.

In a case of judging that a lateral movement of the specified distance or longer is detected (S17: YES), when the predetermined threshold value $Th_1$ has been lowered in step S16, the periodicity determining unit 37b initializes the lowered threshold value $Th_1$ (S18). This makes it possible to detect periodic stationary objects appropriately in accordance with a change in an environment after the lane is changed. Then, the processing shown in FIG. 7 is terminated. Meanwhile, when it is judged that no lateral movement of the specified distance or longer is detected (S17: NO), the processing shown in FIG. 7 is terminated without initializing the predetermined threshold value $Th_1$.

Figure 9:
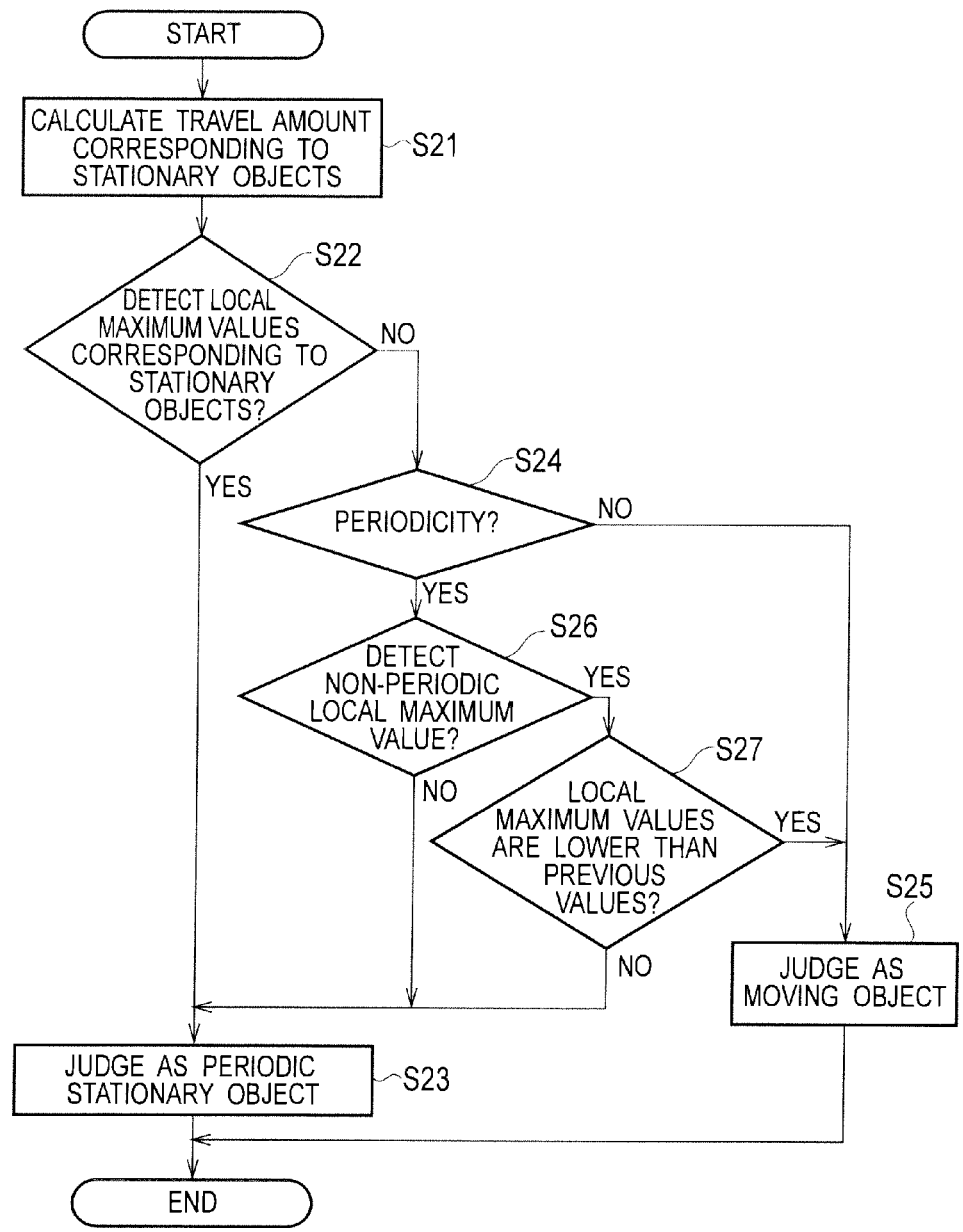
FIG. 9 is a flowchart for illustrating processings by a travel range-calculating unit and a periodic stationary object-judging unit shown in FIG. 3.

FIG. 9 is a flowchart for illustrating processings by the travel range-calculating unit 36 and the periodic stationary object-judging unit 37 shown in FIG. 3. As shown in FIG. 9, first, the travel range-calculating unit 36 calculates a travel amount corresponding to stationary objects (S21). Specifically, the travel range-calculating unit 36 calculates a travel range of the periodic stationary object on the bird's eye view image on the basis of the capturing interval of the camera 10 and the traveling speed of the own vehicle V detected by the vehicle speed sensor 20. In this event, the travel range-calculating unit 36 calculates a travel range having the margin within the predetermined range for the speed of the own vehicle V.

Next, the periodic stationary object-judging unit 37 determines that a periodic stationary object candidate is a periodic stationary object when the periodic stationary object candidate is detected by the periodic stationary object candidate-detecting unit 37a and the detection is made under a predetermined condition. Specifically, the periodic stationary object-judging unit 37 judges whether or not the local maximum values M and M1 to M3 (peaks in the histogram) are present within the range of the travel amount calculated in step S21 (within the travel range) (S22). When judging that any one of the local maximum values M and M1 to M3 is present within the range of the travel amount (S22: YES), the periodic stationary object-judging unit 37 judges that a periodic stationary object is present (i.e., judges that the periodic stationary object candidate detected by the periodic stationary object candidate-detecting unit 37a is a periodic stationary object) (S23). In other words, periodic stationary objects are often aligned at the same intervals, and a specific count value tends to be large. In addition, since a periodic stationary object is stationary, the count value of the travel amount candidate should be within the travel range set in consideration of the speed of the moving object and so forth. Thus, when it is judged to be "YES" in step S22, it can be said that multiple three-dimensional object are periodic stationary objects. Then, the processing shown in FIG. 9 is terminated.

Meanwhile, when judging that any one of the local maximum values M and M1 to M3 is not present within the above-described range of the travel amount (S22: NO), the periodic stationary object-judging unit 37 judges whether or not the periodicity determining unit 37b has determined there is a periodicity (S24). When judging that the periodicity determining unit 37b has not determined there is a periodicity (S24: NO), the periodic stationary object-judging unit 37 judges the three-dimensional object is a moving object (S25). Then, the processing shown in FIG. 9 is terminated.

When judging that the periodicity determining unit 37b has determined there is a periodicity (S24: YES), the periodic stationary object-judging unit 37 detects a non-periodic local maximum value from the local maximum values equal to or larger than the predetermined threshold value $Th_1$ (S26). The non-periodic local maximum value is, for example, the local maximum value M3 shown in FIG. 8. The interval of this local maximum value M3 to an adjacent local maximum value differs from those of the other local maximum values M, M1, M2. Hence, the periodic stationary object-judging unit 37 determines that this local maximum value M3 is a non-periodic local maximum value lacking a periodicity.

Further, when no non-periodic local maximum value is detected (S26: NO), there is a periodicity and no non-periodic local maximum value is present. Accordingly, the periodic stationary object-judging unit 37 judges that a periodic stationary object is present (S23).

Meanwhile, when a non-periodic local maximum value is detected (S26: YES), the periodic stationary object-judging unit 37 judges whether or not the periodic local maximum values M, M1, M2 are lower than previous values (S27). In this processing, the periodic stationary object-judging unit 37 calculates an average value of the periodic local maximum values M, M1, M2 in the current processing, and also calculates an average value of the periodic local maximum values in the previous processing. Then, the periodic stationary object-judging unit 37 judges whether the average value in the current processing is lower than the average value in the previous processing by a predetermined value or larger.

When judging that the periodic local maximum values M, M1, M2 are lower than the previous values (S27: YES), the periodic stationary object-judging unit 37 judges that another vehicle or the like comes between the own vehicle V and the periodic stationary objects, and detects the moving object (S25). Then, the processing shown in FIG. 9 is terminated.

Meanwhile, when judging that the periodic local maximum values M, M1, M2 are not lower than the previous values (S27: NO), the periodic stationary object-judging unit 37 judges that another vehicle or the like comes on an opposite side of the periodic stationary object when viewed from the own vehicle V, and detects the periodic stationary object (S23). Then, the processing shown in FIG. 9 is terminated.

Figure 10:
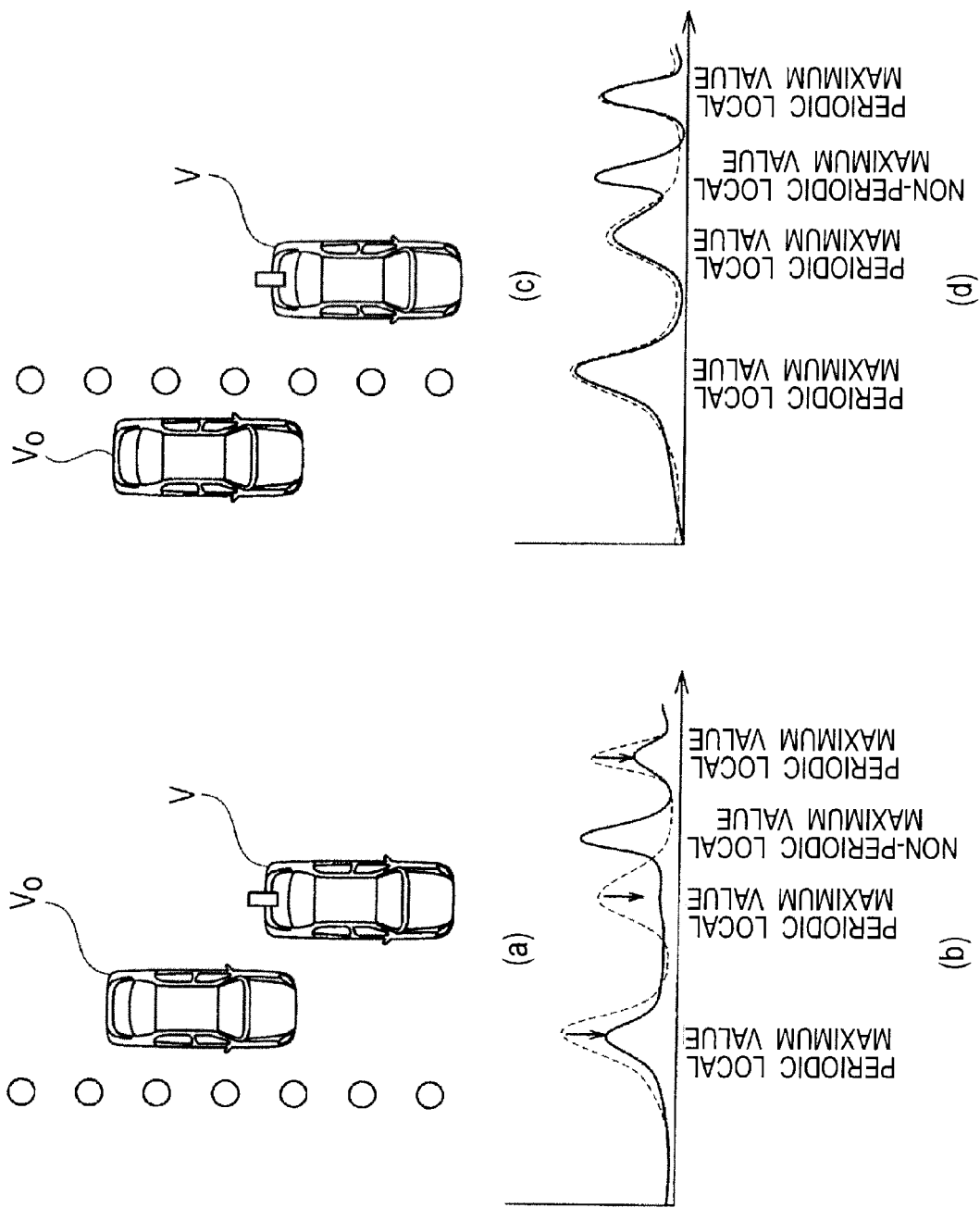
FIG. 10 shows drawings for illustrating the details of step S27 shown in FIG. 9; (a) illustrates a case where another vehicle comes in front of periodic stationary objects, (b) shows a histogram in the case of (a); (c) illustrates a case where another vehicle comes on an opposite side of the periodic stationary objects; and (d) shows a histogram in the case of (c).

FIG. 10 shows drawings for illustrating the details of step S27 shown in FIG. 9; (a) illustrates a case where another vehicle $V_O$ comes in front of periodic stationary objects; (b) shows a histogram in the case of (a). Moreover, (c) illustrates a case where the other vehicle $V_O$ comes on an opposite side of the periodic stationary objects, and (d) shows a histogram in the case of (c). Note that, in FIGS. 10(b) and (d), the broken line represents a histogram before the other vehicle comes, and the solid line represents a histogram after the other vehicle comes.

First, suppose that the other vehicle $V_O$ comes in front of the periodic stationary objects as shown in FIG. 10(a). In this case, since the periodic stationary objects are blocked by the other vehicle $V_O$, the count value of the periodic local maximum value tends to become smaller as shown in FIG. 10(b). Particularly, when the other vehicle $V_O$ comes in front of the periodic stationary objects, the other vehicle $V_O$ may be present at a position where the own vehicle V can change lanes. Hence, in such a case, the periodic stationary object-judging unit 37 detects the other vehicle $V_O$ (moving object).

In contrast, suppose that the other vehicle $V_O$ comes on the opposite side of the periodic stationary objects as shown in FIG. 10(c). In this case, the periodic stationary objects are not blocked by the other vehicle $V_O$. Thus, the count value of the periodic local maximum value is hardly influenced, and the count value of the periodic local maximum value does not become small so much. When the other vehicle $V_O$ comes on the opposite side of the periodic stationary objects, the other vehicle $V_O$ is not present at a position where the own vehicle V can change lanes. Accordingly, in such a case, the periodic stationary object-judging unit 37 detects the periodic stationary objects.

In the periodic stationary object detection system 1 and the periodic stationary object detection method according to the present embodiment, a grounding point (feature point) of a three-dimensional object is extracted from image data on a difference image on a rear lateral region (predetermined region) of a bird's eye view image for each region judged to have the three-dimensional object present on the image data on the difference image (for each of multiple sub regions included in the predetermined region); a histogram (waveform data) corresponding to a distribution of the grounding points in the rear lateral region on the bird's eye view image is calculated; and whether or not the three-dimensional object having the extracted grounding point is a periodic stationary object candidate is judged on the basis of whether or not peak information (peak value, the number of votes regarding peak intervals, and so on) of the histogram is equal to or larger than a predetermined threshold value. Hence, the periodic stationary object detection system 1 and the periodic stationary object detection method enable more clear extraction of the periodicity (repeatability) of periodic stationary objects as the peak information of the waveform data, and periodic stationary object candidates can be more easily extracted from three-dimensional objects included in a captured image. Thereby, more precise extraction of periodic stationary objects is possible.

Periodic stationary objects are often stationary objects having similar appearances and aligned at substantially equal intervals. When the image-capturing device captures an image of such periodic stationary objects while moving, it is difficult to tell that elements of the periodic stationary objects in a previous image correspond to what portions in a current image. Moreover, in this case, it is also difficult to judge that the periodic stationary objects thus captured are stationary objects or moving objects. Further, the periodic stationary objects may be erroneously recognized as moving objects, depending on conditions such as the traveling speed of the moving object, the capturing interval of an image-capturing device, and the pitch of the periodic stationary objects.

The periodic stationary object detection system 1 and the periodic stationary object detection method according to the present embodiment enable more precise extraction of periodic stationary objects from three-dimensional objects included in a captured image, and make it possible to erroneous recognition of the periodic stationary objects as moving objects as described above.

Periodic stationary objects generate difference regions periodically present on a difference image. It is also difficult to calculate travel amounts while linking these periodic difference regions respectively to corresponding portions in the previous image, and it is difficult to judge whether or not there are stationary objects.

In the periodic stationary object detection system 1 and the periodic stationary object detection method according to the present embodiment, travel amount candidates of detected multiple three-dimensional objects are calculated, and the calculated travel amount candidates are counted. Accordingly, the counting is performed while it is unclear that periodic difference regions respectively correspond to what portions in the previous image. Then, when it is judged that a count value within a travel range of a moving object among count values of the travel amount candidates thus counted is equal to or larger than the threshold value $Th_1$, it is judged that the multiple three-dimensional objects are periodic stationary objects. Here, periodic stationary objects are often aligned at the same intervals, and a specific count value tends to be large. In addition, since periodic stationary objects are stationary, the count values of the travel amount candidates should be within the travel range set in consideration of the speed of the moving object and so forth. Thus, when the specific count value within the travel range set in consideration of the speed of the moving object and so forth is equal to or larger than the predetermined threshold value $Th_1$, it can be said that the multiple three-dimensional objects are periodic stationary objects. Therefore, higher precision detection of periodic stationary objects is possible.

Further, in the periodic stationary object detection system 1 and the periodic stationary object detection method according to the present embodiment, multiple travel amount candidates are calculated for each three-dimensional object. This makes it possible to prevent a trouble of erroneously calculating a travel amount of periodic stationary objects having similar image features appearing periodically as a result of solely determining the travel amount of the three-dimensional objects.

In addition, in the periodic stationary object detection system 1 and the periodic stationary object detection method according to the present embodiment, the predetermined threshold value $Th_1$ is obtained from the maximum value M of the count values thus counted. Accordingly, it is possible to set the threshold value $Th_1$ appropriately even if the size of the count values greatly changes due to the positional relation between the moving object and three-dimensional objects, sunlight condition, or the like.

Furthermore, in the periodic stationary object detection system 1 and the periodic stationary object detection method according to the present embodiment, whether or not there is a periodicity is judged from the positions where the local maximum values M and M1 to M3 of the count values thus counted appear. When it is judged that there is a periodicity, the predetermined threshold value $Th_1$ is lowered. Accordingly, once the periodicity is judged, the judgment of periodic stationary objects can be facilitated. Meanwhile, until a periodicity is judged, the predetermined threshold value $Th_1$ is not lowered. This can prevent erroneous detection of three-dimensional objects due to alignment error or the like.

Moreover, in the periodic stationary object detection system 1 and the periodic stationary object detection method according to the present embodiment, a periodicity is judged from the positions where the local maximum values M and M1 to M3 appear, the local maximum values M and M1 to M3 being equal to or larger than the predetermined threshold value $Th_1$ based on the maximum value M of the count values. This makes it possible to ignore a local maximum value, which is a relatively small value, and a periodicity can be judged further precisely with little influence from noise.

Furthermore, in the periodic stationary object detection system 1 and the periodic stationary object detection method according to the present embodiment, when a lateral movement of the specified distance or longer is detected and the predetermined threshold value $Th_1$ has been lowered, the lowered threshold value $Th_1$ is initialized. Thus, the threshold value $Th_1$ is initialized when the own vehicle V changes lanes. This makes it possible to detect periodic stationary objects appropriately in accordance with a change in an environment after the lane is changed.

Additionally, in the periodic stationary object detection system 1 and the periodic stationary object detection method according to the present embodiment, in a case of detecting the local maximum value M3 equal to or larger than the predetermined threshold value $Th_1$ other than the local maximum values M, M1, M2 judged to have a periodicity in the current processing, when an average value of the local maximum values M, M1, M2 judged to have the periodicity in the current processing is not smaller than an average value of the local maximum values judged to have a periodicity in the previous processing by a predetermined value or larger, it is judges that the multiple three-dimensional objects are periodic stationary objects. Meanwhile, when the former is smaller than the latter by the predetermined value or larger, it is judges that a moving object is present.

Moreover, here, as the case of detecting the local maximum value M3 equal to or larger than the predetermined threshold value $Th_1$ other than the local maximum values M, M1, M2 judged to have a periodicity in the current processing, a case is conceivable, for example, where another vehicle or the like comes within the view angle. Such a case conceivably include a case where another vehicle or the like comes on an opposite side of periodic stationary objects when viewed from the own vehicle V, and a case where another vehicle or the like comes on the front side.

When another vehicle or the like comes on the opposite side, the periodic stationary objects hardly influence the periodic local maximum values M, M1, M2, and the non-periodic local maximum value M3 tends to be detected. Meanwhile, when another vehicle or the like comes on the front side, the periodic stationary objects are blocked by the other vehicle or the like, and the count values of the periodic local maximum values M, M1, M2 tend to be small.

Hence, when the average value of the local maximum values M, M1, M2 judged to have the periodicity in the current processing is not smaller than the average value of the local maximum values judged to have the periodicity in the previous processing by the predetermined value or larger, another vehicle or the like is located on on the opposite side of the periodic stationary objects where the own vehicle V cannot change lanes. Hence, it is not necessary to detect a moving object such as the other vehicle. Meanwhile, when the average value of the local maximum values M, M1, M2 judged to have the periodicity in the current processing is smaller than the average value of the local maximum values judged to have the periodicity in the previous processing by the predetermined value or larger, another vehicle or the like is present in front of the periodic stationary objects where the own vehicle V can change lanes. Hence, the moving object is detected.

Thus, the periodic stationary object detection system 1 and the periodic stationary object detection method according to the present embodiment can make an appropriate judgment in accordance with an actual phenomenon.

Note that, in the above-described embodiment, images captured at a current time and at a time one time segment earlier are converted into bird's eye views, and the difference image $PD_t$ is created by performing alignment on the converted bird's eye views. However, the present invention is not limited thereto. For example, only an image at a time one time segment earlier is converted into a bird's eye view; the converted bird's eye view is subjected to alignment and then converted again into an originally captured image; this image and an image at a current time may be used to create a difference image. In other words, bird's eye views do not always have to be created explicitly, as long as an image at a current time and an image at a time one time segment earlier are aligned to create a difference image $PD_t$ from a difference between the two images thus aligned.

Second Embodiment

Hereinafter, a second embodiment of the present invention will be described based on the drawings. Note that those equivalent to what have been described in the first embodiment are denoted by the same reference signs, and the description thereof is omitted.

Figure 11:
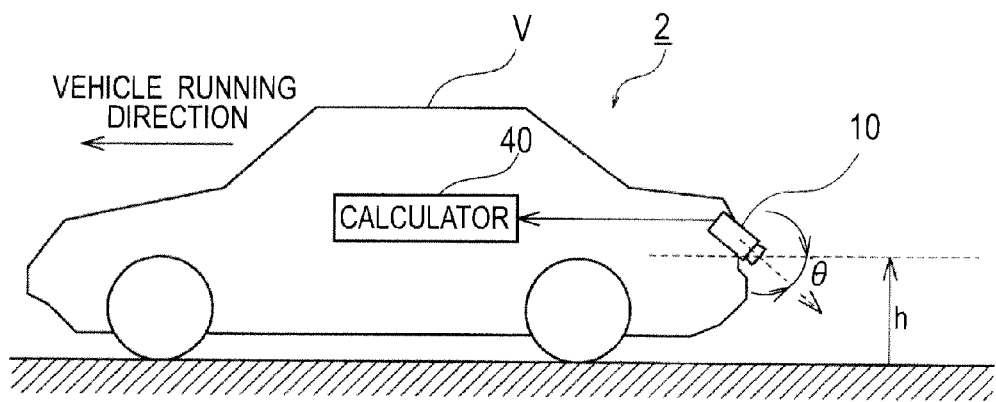
FIG. 11 is a schematic configuration diagram of a periodic stationary object detection system according to a second embodiment of the present invention, illustrating an example where the periodic stationary object detection system is mounted on a vehicle.

FIG. 11 is a schematic configuration diagram of a periodic stationary object detection system 2 according to the present embodiment. The present embodiment describes an example where the periodic stationary object detection system 2 is mounted on the own vehicle V. As shown in FIG. 11 the periodic stationary object detection system 2 includes the camera 10 and a calculator 40.

Figure 12:
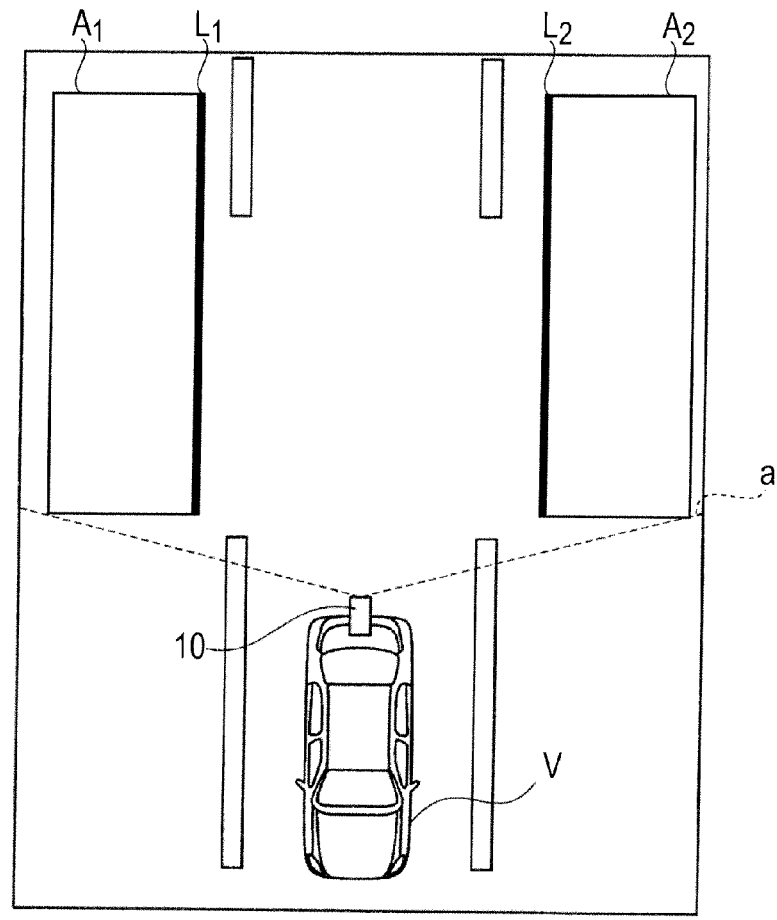
FIG. 12 is a view for illustrating a running state of the own vehicle shown in FIG. 11 and a captured range of an image-capturing device.

FIG. 12 is a view for illustrating a captured range of the camera 10 shown in FIG. 11, and so forth. As shown in FIG. 12, the camera 10 is configured to capture an image of a region sideways behind the own vehicle V at the predetermined view angle a as in the first embodiment. The view angle a of the camera 10 is set so that the captured range of the camera 10 can include an adjacent lane or a roadside in addition to the lane where the own vehicle V runs.

The calculator 40 executes various processings on portions in detection regions $A_1$, $A_2$ of periodic stationary objects in the captured image captured by the camera 10. Thereby, the calculator 40 determines whether or not three-dimensional objects present in the detection regions $A_1$, $A_2$ are periodic stationary objects. The detection regions $A_1$, $A_2$ have a rectangular shape when viewed from the above. The positions of the detection regions $A_1$, $A_2$ may be set based on the relative positions to the own vehicle V, or may be set based on the position of a white line by utilizing an existing white line recognition technique or the like. The shape of the detection regions $A_1$, $A_2$ on a bird's eye view image is not limited to the rectangular shape. When the detection region is a rectangular region in an actual space, the shape of the detection regions $A_1$, $A_2$ on a bird's eye view image may be a trapezoidal shape.

Sides of the detection regions $A_1$, $A_2$ close to the own vehicle V (sides along the running direction) are set as grounding lines $L_1$, $L_2$. The grounding lines $L_1$, $L_2$ mean lines where another vehicle $V_O$ present on a lane adjacent to the lane where the own vehicle V runs and a periodic stationary object present along a roadside come into contact with the ground.

A distance in the vehicle running direction from a rear end portion of the own vehicle V to front end portions of the detection regions $A_1, A_2$ is determined in such a manner that at least the detection regions $A_1, A_2$ are within the view angle a of the camera 10.

Moreover, a length of each of the detection regions $A_1, A_2$ in the vehicle running direction and a width thereof in a direction orthogonal to the vehicle running direction are determined on the basis of the size of a periodic stationary object to be detected. In the present embodiment, to distinguish a periodic stationary object from the other vehicle $V_O$, the length in the vehicle running direction is set as a length that can include at least the other vehicle $V_O$. In addition, the width in the direction orthogonal to the vehicle running direction has a length not including lanes (i.e., second adjacent lanes), which are further adjacent to lanes adjacent on right and left sides in the bird's eye view image.

Figure 13:
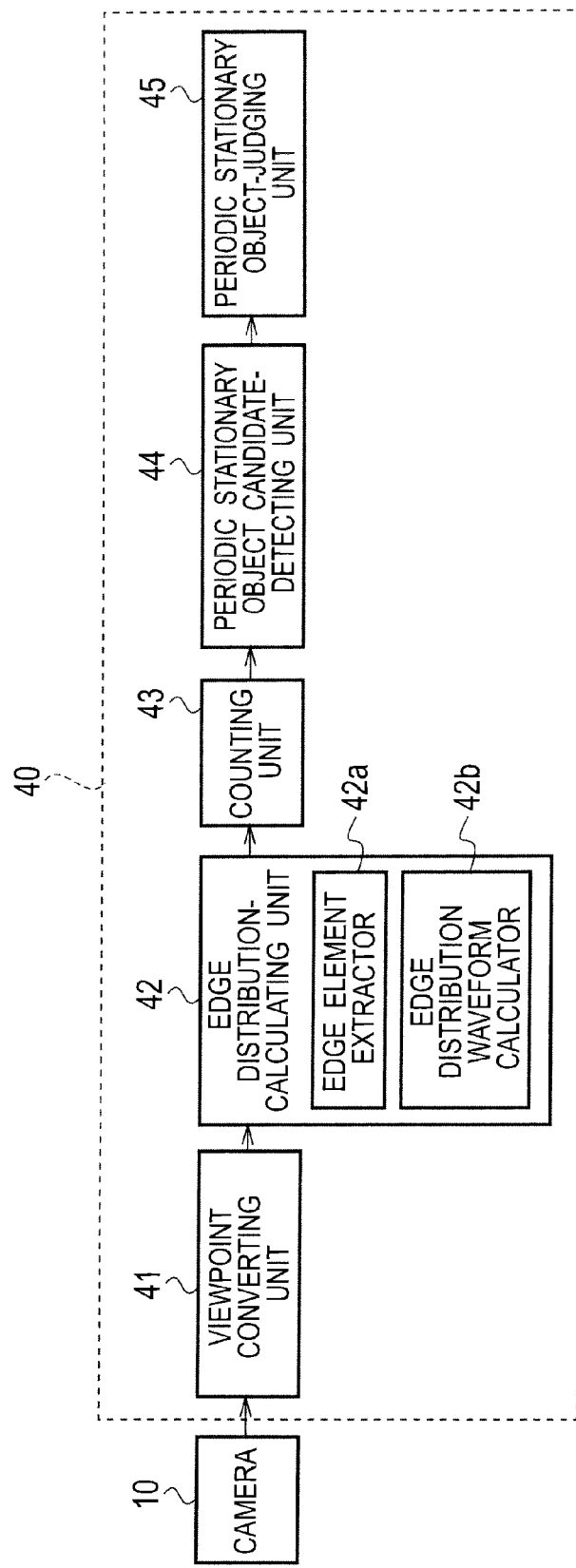
FIG. 13 is a block diagram for illustrating the details of a calculator shown in FIG. 11.

FIG. 13 is a block diagram for illustrating the details of the calculator 40 shown in FIG. 11. As shown in FIG. 13, the calculator 40 includes a viewpoint converting unit 41, an edge distribution-calculating unit 42, a counting unit 43, a periodic stationary object candidate-detecting unit 44, and a periodic stationary object-judging unit 45. Note that the calculator 40 is a computer constituted of a CPU, a RAM, a ROM, and so forth. The calculator 40 performs image processing and the like according to a program set in advance to thereby implement the function of each unit such as the viewpoint converting unit 41, the edge distribution-calculating unit 42, the counting unit 43, the periodic stationary object candidate-detecting unit 44, and the periodic stationary object-judging unit 45.

The viewpoint converting unit 41 is configured to receive captured image data on a predetermined region obtained through the capturing by the camera 10. The viewpoint converting unit 41 is configured to perform viewpoint conversion to convert the received captured image data to bird's eye view image data on a state of being viewed from bird's eyes. The state of being viewed from bird's eyes refers to a state of being viewed from a virtual camera that looks, for example, vertically downward (or slightly obliquely downward) from the sky.

Figure 14:
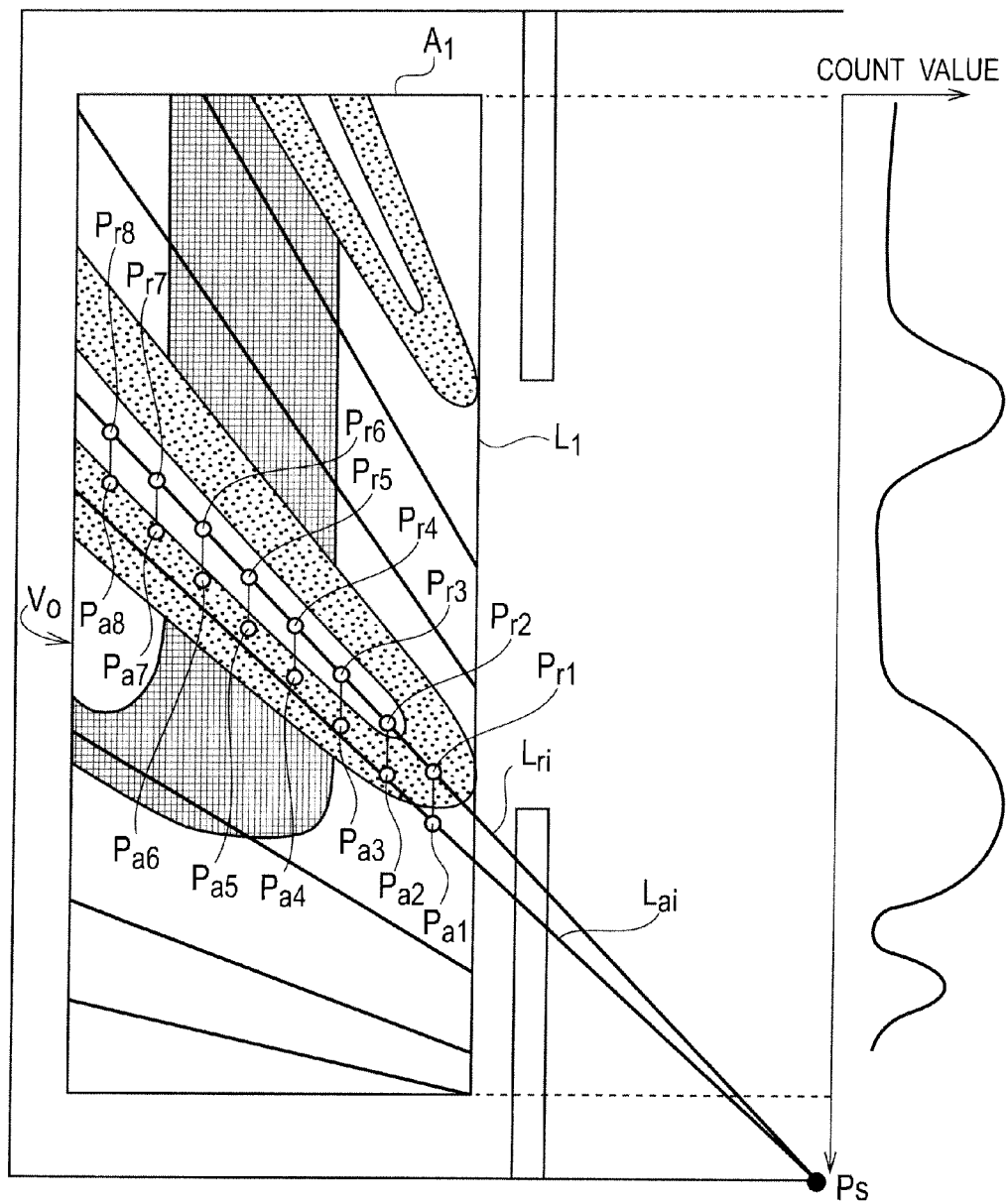
FIG. 14 is a view for illustrating detailed operations of an edge distribution-calculating unit, a counting unit, a periodic stationary object candidate-detecting unit, and a periodic stationary object-judging unit shown in FIG. 13.

FIG. 14 is a view for illustrating detailed operations of the edge distribution-calculating unit 42, the counting unit 43, the periodic stationary object candidate-detecting unit 44, and the periodic stationary object-judging unit 45. Note that although FIG. 14 describes by illustrating only the right side in the vehicle running direction including the detection region $A_1$, the edge distribution-calculating unit 42, the counting unit 43, the periodic stationary object candidate-detecting unit 44, and the periodic stationary object-judging unit 45 perform the same processings for the region on the left side in the vehicle running direction including the detection region $A_2$.

As shown in FIG. 13, the edge distribution-calculating unit 42 includes an edge element extractor 42a and an edge distribution waveform calculator 42b. The edge element extractor 42a is configured to calculate a luminance difference in the bird's eye view image data obtained through the viewpoint conversion by the viewpoint converting unit 41 in order to detect an edge constituent element (hereinafter, referred to as edge element (feature point)) of a periodic stationary object included in a bird's eye view image. The edge element extractor 42a calculates a luminance difference between two pixels near each of multiple positions along a vertical virtual line extending in a vertical direction in an actual space.

Specifically, the edge element extractor 42a sets a first vertical virtual line corresponding to a line segment extending in the vertical direction in the actual space and a second vertical virtual line corresponding to a line segment extending in the vertical direction in the actual space, on a bird's eye view image after the viewpoint conversion. The edge element extractor 42a sequentially obtains luminance differences along the first vertical virtual line between points on the first vertical virtual line and points on the second vertical virtual line.

The edge distribution waveform calculator 42b is configured to sum the number of edge elements extracted by the edge element extractor 42a for each of the multiple vertical virtual lines, and to calculate an edge distribution waveform on the basis of the number of edge elements thus summed.

The operations of the edge element extractor 42a and the edge distribution waveform calculator 42b will be described more specifically.

As shown in FIG. 14, the edge element extractor 42a sets multiple first vertical virtual lines $L_{ai}$ (hereinafter referred to as attention lines $L_{ai}$), which are line segments extending in the vertical direction from points on the grounding line $L_1$ in the actual space and pass through the detection region $A_1$. The number of the attention lines $L_{ai}$ is not particularly limited. In the description below, the description will be given of a case where n attention lines s $L_{ai}$ (i=1 to n) are set.

Moreover, the edge element extractor 42a sets multiple second vertical virtual lines $L_{ri}$ (hereinafter referred to as reference lines $L_{ri}$), which respectively correspond to the multiple attention lines $L_{ai}$, are line segments extending in the vertical direction from points on the grounding line $L_1$ in the actual space, and pass through the detection region $A_1$. Each of the reference lines $L_{ri}$ is set at a position apart from the attention line $L_{ai}$ corresponding in the actual space by a predetermined distance (for example, 10 cm). Note that the lines corresponding to the line segments extending in the vertical direction in the actual space become lines spreading radially from a position $P_S$ at the camera 10 in the bird's eye view image.

Next, the edge element extractor 42a sets multiple attention points $P_{aj}$ on each of the attention lines $L_{ai}$. In the example shown in FIG. 14, attention points $P_{a1}$ to $P_{a8}$ are set, but the number of the attention points $P_{aj}$ is not particularly limited. In the description below, the description will be given of a case where k attention points $P_{aj}$ (j=1 to k) are set.

Further, the edge element extractor 42a sets multiple reference points $P_{rj}$ on each of the reference lines $L_{ri}$, the reference points $P_{rj}$ respectively corresponding to the attention points $P_{aj}$. The attention points $P_{aj}$ and the reference points $P_{rj}$ corresponding to each other are set at substantially the same height in the actual space. Note that the attention points $P_{aj}$ and the reference points $P_{rj}$ do not always have to be at the same height in a strict sense. It is a matter of course that some differences in height are allowable as long as the heights of the attention points $P_{aj}$ and the reference points $P_{rj}$ can be regarded as the same.

The edge element extractor 42a sequentially obtains luminance differences along each of the attention lines $L_{ai}$ between the attention points $P_{aj}$ and the reference points $P_{rj}$ corresponding to each other. In the example shown in FIG. 14, the edge element extractor 42a calculates a luminance difference between the first attention point $P_{a1}$ and the first reference points $P_{r1}$, and calculates a luminance difference between the second attention points $P_{a2}$ and the second reference points $P_{r2}$. Then, similarly, the edge element extractor 42a sequentially obtains luminance differences between the third to eighth attention points $P_{a3}$ to $P_{a8}$ and the third to eighth reference points $P_{r3}$ to $P_{r8}$.

When the luminance difference between an attention point $P_{aj}$ and a reference point $P_{rj}$ is equal to or larger than a predetermined value, the edge element extractor 42a determines that an edge element is present between the attention point $P_{aj}$ and the reference point $P_{rj}$. In this manner, the edge element extractor 42a functions as a feature point-extracting unit configured to extract an edge element (feature point) present along each of the multiple vertical virtual lines extending in the vertical direction in the actual space. In other words, the edge element extractor 42a extracts a feature point (edge element) of a three-dimensional object from image data on a predetermined region (detection region) of the bird's eye view image for each of multiple sub regions (every region near multiple vertical virtual lines) included in the predetermined region.

The edge distribution waveform calculator 42b counts how many edge elements extracted by the edge element extractor 42a are present along a single attention line $L_{ai}$. The edge distribution waveform calculator 42b stores the number of edge elements thus counted as an attribute of each attention lines $L_{ai}$.

The edge distribution waveform calculator 42b counts edge elements for all of the attention lines $L_{ai}$. Note that the lengths of portions of the attention lines $L_{ai}$ overlapping with the detection region $A_1$ differ from each other, depending on where each of the attention lines $L_{ai}$ is located. The number of edge elements thus counted may be normalized by dividing the number by the length of an overlapping portion of the corresponding attention line $L_{ai}$.

In the example shown in FIG. 14, the other vehicle $V_O$ is displayed in the detection region $A_1$. Suppose that the attention line $L_{ai}$ is set on a rubber portion of a tire of the other vehicle $V_O$, and that the reference line $L_{ri}$ is set at a position approximately 10 cm apart therefrom on a wheel of the tire. In this case, since the first attention points $P_{a1}$ and the first reference points $P_{r1}$ are located at the same tire portion, the luminance difference therebetween is small. Meanwhile, the second to eighth attention points $P_{a2}$ to $P_{a8}$ are located at the rubber portion of the tire, and the second to eighth reference points $P_{r2}$ to $P_{r8}$ are located at the wheel portion of the tire, which makes the luminance differences therebetween large. When the luminance differences between the second to eighth attention points $P_{a2}$ to $P_{a8}$ and the second to eighth reference points $P_{r2}$ to $P_{r8}$ are equal to or larger than the predetermined value, the edge element extractor 42a detects that edge elements are present between the second to eighth attention points $P_{a2}$ to $P_{a8}$ and the second to eighth reference points $P_{r2}$ to $P_{r8}$. Additionally, since the number of the second to eighth attention points $P_{a2}$ to $P_{a8}$ present along the attention line $L_{ai}$ is 7, the edge element extractor 42a detects edge elements 7 times. In this case, the edge distribution waveform calculator 42b counts the edge element value as "7".

Further, the edge distribution waveform calculator 42b makes a graph of the count value of the edge element obtained for each attention line $L_{ai}$, and obtains an edge distribution waveform (waveform data). Specifically, the edge distribution wavefo calculator 42b plots the count value of the edge element on a plane where the vertical axis represents the count value of the edge element, and the horizontal axis represents the position of the attention line $L_{ai}$ on the grounding line $L_1$ in the actual space. In a case where the attention lines $L_{a1}$ to $L_{an}$ are set at equal intervals on the grounding line $L_1$ in the actual space, the edge distribution waveform can be obtained by merely aligning the count values of the edge elements obtained for each attention line $L_{ai}$ in the order of the attention lines $L_{a1}$ to $L_{an}$. In the example shown in FIG. 14, the attention line $L_{ai}$ set at the rubber portion of the tire of the other vehicle $V_O$ has a count value of the edge element of "7" at the position crossing the grounding line $L_1$ on the bird's eye view image.

In this manner, the edge distribution waveform calculator 42b functions as a waveform data-calculating unit configured to sum the number of edge elements extracted by the edge element extractor 42a for each of the multiple vertical virtual lines extending in the vertical direction in the actual space, and to calculate an edge distribution waveform (waveform data) on the basis of the number of edge elements thus summed. In other words, the edge distribution waveform calculator 42b calculates waveform data (based on the relative positional relation of the edge elements) corresponding to the distribution of the feature points (edge elements) in the predetermined region (detection region) on the bird's eye view image.

The counting unit 43 is configured to detect peaks of the edge distribution waveform calculated by the edge distribution waveform calculator 42b of the edge distribution-calculating unit 42. The peak is a point on the edge distribution waveform where the count value of the edge element changes from increasing to decreasing. The counting unit 43 detects peaks after noise reduction processing is performed on the edge distribution waveform with, for example, a low-pass filter, a moving average filter, or the like. Here, the peak to be detected may be only a peak having a value equal to or larger than a predetermined threshold value. The predetermined threshold value can be set to, for example, a value of 60% of the maximum value of the edge distribution waveform.

Moreover, the counting unit 43 counts the number of peaks aligned at equal intervals among the peaks thus detected (peak information). Specifically, the counting unit 43 calculates distances among the peaks thus detected, extracts peaks having the calculated peak distance within a predetermined range, and counts the number of the peaks. The "predetermined range" for the peak distance may be a fixed value set in advance according to the type of periodic stationary objects to be detected, or may be a variable value set on the basis of peak distances sequentially detected for a predetermined time period or longer. Note that when detecting peaks from the edge distribution waveform, the counting unit 43 skips a peak detected at a previous time in some cases. In such a case, the peak interval is detected as having the size twice, three times, or larger than the size of the actual interval. Hence, in order to prevent miscounting of peaks aligned at equal intervals, the "predetermined range" is set in such a manner as to include values corresponding to multiples of the interval of peaks that should be extracted primarily. For example, when the interval of peaks that should be extracted primarily is X, the "predetermined range" for the peak distance is set as X±10%, 2X±20%, 3X±30%. In this manner, the counting unit 43 functions as a peak information detecting unit configured to detect peak information of the waveform data.

The periodic stationary object candidate-detecting unit 44 is configured to determine whether or not a three-dimensional object having an extracted edge element is a periodic stationary object candidate on the basis of whether or not the number of peaks (peak information) counted by the counting unit 43 is equal to or larger than a predetermined threshold value $Th_2$. Specifically, when the number of peaks counted by the counting unit 43 is equal to or larger than the predetermined threshold value $Th_2$, the periodic stationary object candidate-detecting unit 44 determines that objects corresponding to the counted peaks are periodic stationary object candidates. The threshold value $Th_2$ is a value determined according to the type of periodic stationary objects to be detected, such as pylons, guardrail posts, or utility poles, for example, and can be determined through experiments or the like. Specifically, the threshold value $Th_2$ is set to be a value of, for example, 3 to 100 both inclusive.

When a periodic stationary object candidate is continuously detected for a predetermined time period, the periodic stationary object-judging unit 45 is configured to determine that the periodic stationary object candidate is a periodic stationary object. Specifically, when the periodic stationary object candidate-detecting unit 44 continuously detects for a predetermined time period a state where the number of peaks is being equal to or larger than the predetermined threshold value $Th_2$, the periodic stationary object-judging unit 45 judges there is a sufficiently high possibility that the detected, periodic stationary object candidate is a periodic stationary object. Then, the periodic stationary object-judging unit 45 determines that the objects corresponding to the counted peaks are periodic stationary objects. The "predetermined time period" is a value determined according to the type of periodic stationary objects to be detected, and can be obtained through experiments or the like. The value may be a fixed value, or may vary according to the capturing interval of the camera 10 and the traveling speed of the own vehicle V. Specifically, the "predetermined time period" is set at, for example, 0.1 to 5 seconds.

Figure 15:
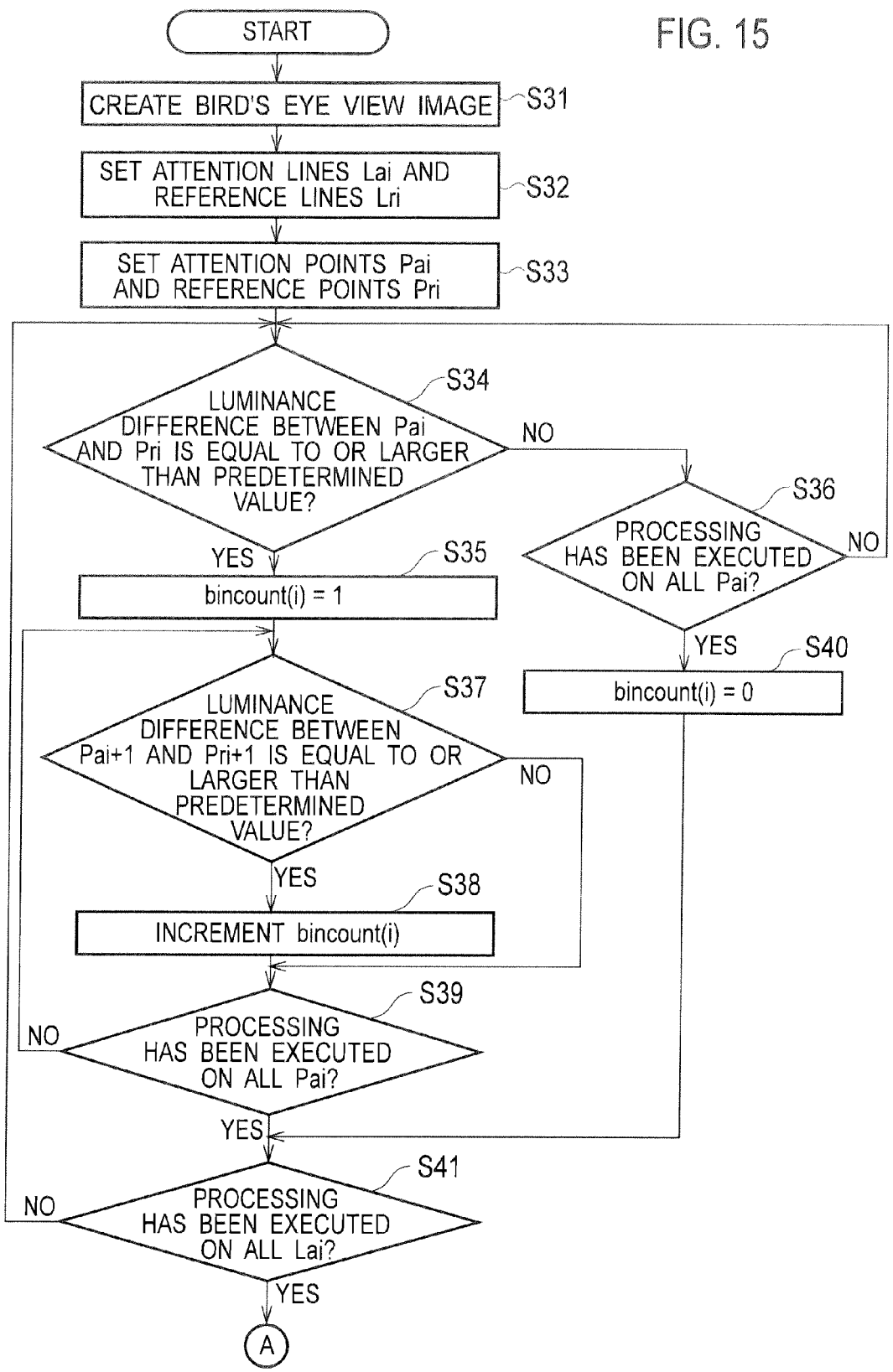
FIG. 15 is a flowchart for illustrating the details of a periodic stationary object detection method according to the second embodiment of the present invention.
Figure 16:
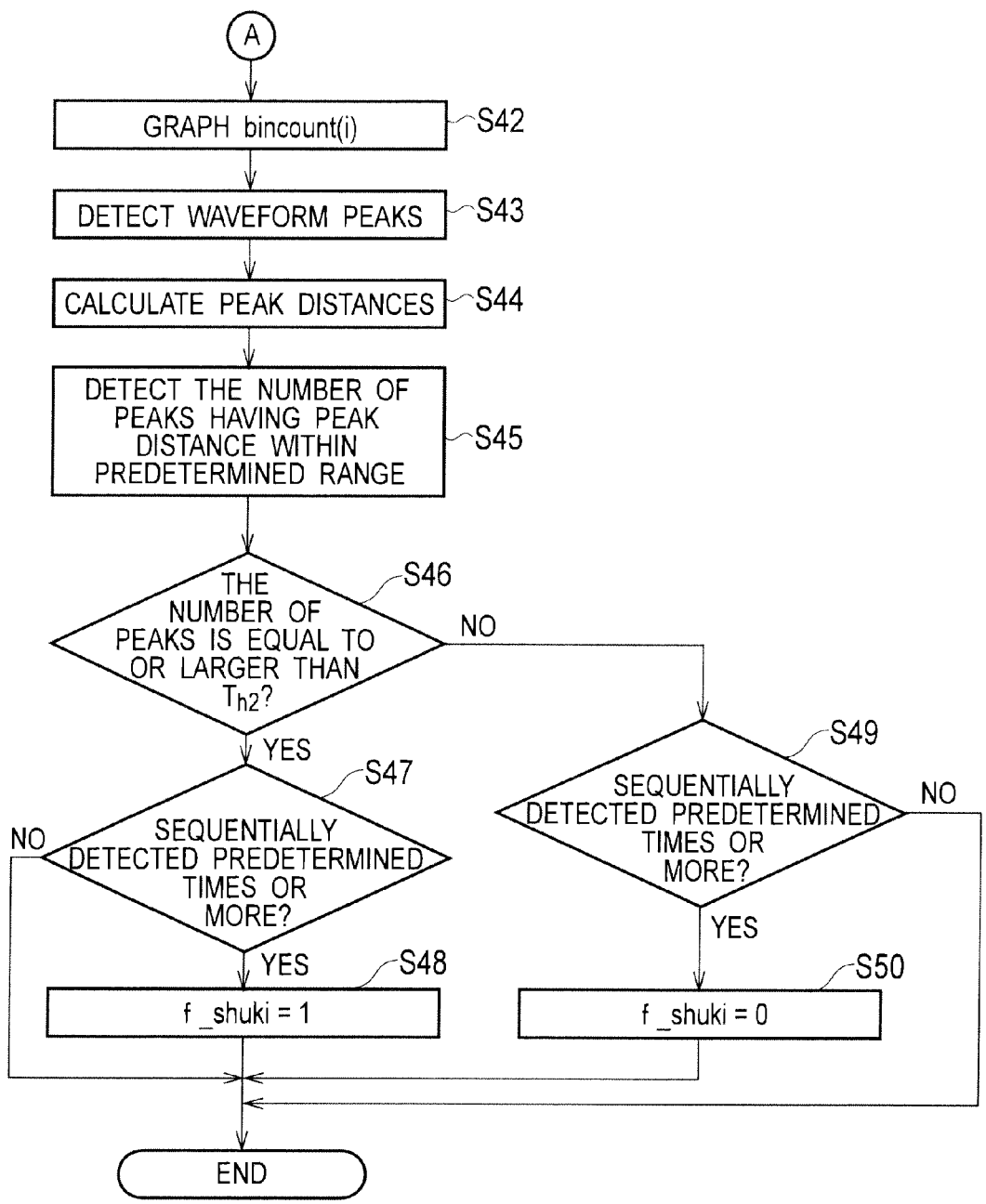
FIG. 16 is a flowchart for illustrating the details of the periodic stationary object detection method according to the second embodiment of the present invention, illustrating processings after FIG. 15.

Next, a periodic stationary object detection method according to the present embodiment will be described. FIGS. 15 and 16 are flowcharts for illustrating the details of the periodic stationary object detection method according to the present embodiment. Note that, in FIGS. 15 and 16, the description will be given of the processing targeting the detection region $A_1$ for convenience; nevertheless, the same processing can be performed on the detection region $A_2$ as well.

As shown in FIG. 15, first, in step S31, the viewpoint converting unit 41 receives captured image data on a predetermined region obtained through the capturing by the camera 10, and performs viewpoint conversion thereon to create bird's eye view image data.

Next, in step S32, the edge distribution-calculating unit 42 sets n attention lines $L_{ai}$ on the detection region $A_1$, and sets n reference lines $L_{ri}$, which respectively correspond to the n attention lines $L_{ai}$ (i=1 to n). The edge distribution-calculating unit 42 sets line segments extending in the vertical direction from points on the grounding line $L_1$ in the actual space as the attention lines $L_{ai}$. Moreover, the edge distribution-calculating unit 42 sets line segments, which extend in the vertical direction from points on the grounding line $L_1$ in the actual space and are apart from the attention lines $L_{ai}$ corresponding in the actual space by a predetermined distance, as the reference lines $L_{ri}$.

Next, in step S33, the edge distribution-calculating unit 42 sets k attention points $P_{aj}$ on each of the attention lines $L_{ai}$, and sets k reference points $P_{rj}$ (j=1 to k) on each of the reference lines $L_{ri}$, the k reference points $P_{rj}$ respectively corresponding to the attention points $P_{aj}$. The edge distribution-calculating unit 42 performs the settings in such a manner that the attention points $P_{aj}$ and the reference points $P_{rj}$ correspond to each other at substantially the same height in the actual space.

Next, in step S34, the edge distribution-calculating unit 42 determines whether or not a luminance difference between an attention point $P_{aj}$ and a reference point $P_{rj}$ corresponding to each other is equal to or larger than the predetermined value. When determining that the luminance difference is equal to or larger than the predetermined value, the edge distribution-calculating unit 42 judges that an edge element is present between the attention point $P_{aj}$ and the reference points $P_{rj}$ thus judged, and substitutes "1" for a count value (bincount (i)) of the i-th attention line $L_{ai}$ in step S35. In step S34, when determining that the luminance difference is smaller than the predetermined value, the edge distribution-calculating unit 42 judges that no edge element is present between the attention point $P_{aj}$ and the reference point $P_{rj}$ thus judged, and advances the processing to step S36.

In step S36, the edge distribution-calculating unit 42 determines whether or not the processing in step S34 has been executed on all of the attention points $P_{aj}$ on the attention line $L_{ai}$ currently processed. When determining that the processing in step S34 is not executed on all of the attention points $P_{aj}$, the edge distribution-calculating unit 42 returns the processing to step S34, obtains a luminance difference between the next attention point $P_{aj+1}$ and reference point $P_{rj+1}$, and determines whether or not the luminance difference is equal to or larger than the predetermined value. In this manner, the edge distribution-calculating unit 42 sequentially obtains the luminance differences between the attention points $P_{aj}$ and the reference points $P_{rj}$ along the attention line $L_{ai}$ in sequence. When the obtained luminance difference becomes equal to or larger than the predetermined value, the edge distribution-calculating unit 42 judges that an edge element is present.

After substituting "1" for the count value (bincount(i)) of the i-th attention line $L_{ai}$ in step S35, the edge distribution-calculating unit 42 advances the processing to step S37. Then, the edge distribution-calculating unit 42 obtains a luminance difference between the next attention point $P_{aj+1}$ and reference point $P_{rj+1}$, and determines whether or not the luminance difference is equal to or larger than the predetermined value. When determining that the luminance difference is equal to or larger than the predetermined value, the edge distribution-calculating unit 42 judges that an edge element is present between the attention point $P_{aj+1}$ and the reference point $P_{rj+1}$ thus judged, and increments the count value (bincount(i)) of the i-th attention line $L_{ai}$ in step S38.

In step S37, when determining that the luminance difference is smaller than the predetermined value, the edge distribution-calculating unit 42 judges that no edge element is present between the attention point $P_{aj+1}$ and the reference points $P_{rj+1}$ thus judged, and advances the processing to step S39, skipping step S38.

Next, in step S39, the edge distribution-calculating unit 42 determines whether or not the processing in step S34 or S37 has been executed on all of the attention points $P_{aj}$ on the attention line $L_{ai}$ currently processed. When determining that the processing is not executed on all of the attention points $P_{aj}$, the edge distribution-calculating unit 42 returns the processing to step S37, obtains a luminance difference between the next attention point $P_{aj+1}$ and reference point $P_{rj+1}$, and determines whether or not the luminance difference is equal to or larger than the predetermined value. In step S39, when determining that the processing has been executed on all of the attention points $P_{aj}$, the edge distribution-calculating unit 42 advances the processing to step S41. In this manner, the edge distribution-calculating unit 42 counts how many edge elements are present along the same attention line $L_{ai}$, and stores the number of edge elements thus counted as an attribute (bincount(i)) of the attention line $L_{ai}$.

Note that, in step S36, when determining that the processing in step S34 has been executed on all of the attention points $P_{aj}$, the edge distribution-calculating unit 42 judges that no edge element is present on the attention line $L_{ai}$ currently processed. Then, the edge distribution-calculating unit 42 substitutes "0" for the bincount(i) in step S40, and advances the processing to step S41.

Next, in step S41, the edge distribution-calculating unit 42 determines whether or not the above processing has been executed on all of the n attention lines $L_{ai}$. When determining that the processing is not executed on all of the attention lines $L_{ai}$, the edge distribution-calculating unit 42 returns the processing to step S34 and executes the processing on the next attention line $L_{ai+1}$. In step S41, when determining that the processing has been executed on all of the attention lines $L_{ai}$, the edge distribution-calculating unit 42 advances the processing to step S42.

Next, in step S42, the edge distribution-calculating unit 42 makes a graph of count value bincount(i) (i=1 to n) of the edge element obtained for each of the n attention lines $L_{ai}$, and obtains an edge distribution waveform. Specifically, the edge distribution-calculating unit 42 plots the count value bincount (i) (i=1 to n) of the edge element on a plane where the vertical axis represents the count value of the edge element, and the horizontal axis represents the position of the attention line $L_{ai}$ on the grounding line $L_1$ in the actual space.

Subsequently, in step S43, the counting unit 43 detects peaks of the edge distribution waveform calculated by the edge distribution-calculating unit 42.

Subsequently, in step S44, the counting unit 43 calculates distances among the peaks thus detected.

Subsequently, in step S45, the counting unit 43 extracts peaks having the calculated peak distance within a predetermined range, and counts the number of the peaks.

Subsequently, in step S46, the periodic stationary object candidate-detecting unit 44 determines whether or not the number of peaks counted by the counting unit 43 is equal to or larger than the predetermined threshold value $Th_2$. When determining that the number of peaks is equal to or larger than the predetermined threshold value $Th_2$, the periodic stationary object candidate-detecting unit 44 determines that objects corresponding to the counted peaks are periodic stationary object candidates, and advances the processing to step S47.

In step S47, the periodic stationary object-judging unit 45 judges whether or not a state where the number of peaks is being equal to or larger than the predetermined threshold value $Th_2$ is sequentially detected predetermined times or more. When judging that the state where the number of peaks is being equal to or larger than the predetermined threshold value $Th_2$ is sequentially detected the predetermined times or more, the periodic stationary object-judging unit 45 judges that the objects corresponding to the counted peaks are periodic stationary objects, and substitutes "1" for a flag f_shuki in step S48. Meanwhile, in step S47, when judging that the state where the number of peaks is being equal to or larger than the predetermined threshold value $Th_2$ is not sequentially detected the predetermined times or more, the periodic stationary object-judging unit 45 skips step S48, and maintains the value of the flag f_shuki. Thereafter, the processings in FIGS. 15 and 16 are terminated.

In step S46, when determining that the number of peaks is smaller than the predetermined threshold value $Th_2$, the periodic stationary object candidate-detecting unit 44 advances the processing to step S49.

In step S49, the periodic stationary object-judging unit 45 judges whether or not a state where the number of peaks is being smaller than the predetermined threshold value $Th_2$ is sequentially detected predetermined times or more. When judging that the state where the number of peaks is being smaller than the predetermined threshold value $Th_2$ is sequentially detected the predetermined times or more, the periodic stationary object-judging unit 45 judges that the objects corresponding to the counted peaks are not periodic stationary objects, and substitutes "0" for the flag f_shuki in step S50. Meanwhile, in step S49, when judging that the state where the number of peaks is being smaller than the predetermined threshold value $Th_2$ is not sequentially detected the predetermined times or more, the periodic stationary object-judging unit 45 skips step S50 and maintains the value of the flag f_shuki. Thereafter, the processings in FIGS. 15 and 16 are terminated.

In the periodic stationary object detection system 2 and the periodic stationary object detection method according to the present embodiment, an edge element (feature point) of a three-dimensional object s extracted from image data on a predetermined region of a bird's eye view image for each of regions (sub regions) near multiple vertical virtual lines included in the predetermined region; an edge distribution waveform (waveform data) corresponding to a distribution of the edge elements in the predetermined region is calculated; and whether or not the three-dimensional object having the extracted edge element is a periodic stationary object candidate is judged on the basis of whether or not the number of peaks (peak information) of the edge distribution waveform is equal to or larger than a predetermined threshold value. This, similarly to the first embodiment, enables more clear extraction of the periodicity (repeatability) of periodic stationary objects as the peak information of the waveform data, and periodic stationary object candidates can be more easily extracted from three-dimensional objects included in a captured image. Thereby, more precise extraction of periodic stationary objects is possible.

Moreover, in the periodic stationary object detection system 2 and the periodic stationary object detection method according to the present embodiment, the number of edge elements present along each of multiple vertical virtual lines extending in the vertical direction in an actual space is summed, and an edge distribution waveform is obtained on the basis of the number of edge elements thus summed. In addition, when the number of peaks of the edge distribution waveform is equal to or larger than the predetermined threshold value $Th_2$, it is determined that the three-dimensional object having the extracted edge element is a periodic stationary object candidate. Hence, a case where edges extending in the vertical direction are highly densely aligned is surely detected without determining that the detected three-dimensional objects are stationary objects or moving objects. Thus, it is made possible to more easily detect periodic stationary object candidates which are more likely to be periodic stationary objects.

Particularly, in the periodic stationary object detection system 2 and the periodic stationary object detection method according to the present embodiment, the number of peaks aligned at equal intervals is counted among the peaks of the edge distribution waveform. Hence, it is possible to further reliably detect periodic stationary object candidates which have edges extending in the vertical direction and aligned highly densely at equal intervals and are more likely to be periodic stationary objects.

Further, in the periodic stationary object detection system 2 and the periodic stationary object detection method according to the present embodiment, when a periodic stationary object candidate is continuously detected for a predetermined time period, it is determined that the periodic stationary object candidate is a periodic stationary object. Hence, erroneous detection due to noise is prevented, and periodic stationary objects can be more reliably detected.

Third Embodiment

Hereinafter, a third embodiment of the present invention will be described based on the drawings. Note that those equivalent to what have been described in the first and the second embodiments are denoted by the same reference signs, and the description thereof is omitted.

A periodic stationary object detection system 3 according to the present embodiment has the same schematic configuration as that of the periodic stationary object detection system 1 shown in FIG. 1, but includes a calculator 40' in place of the calculator 30. Specifically, the periodic stationary object detection system 3 according to the present embodiment includes the camera 10, the vehicle speed sensor 20, and the calculator 40'.

Figure 17:
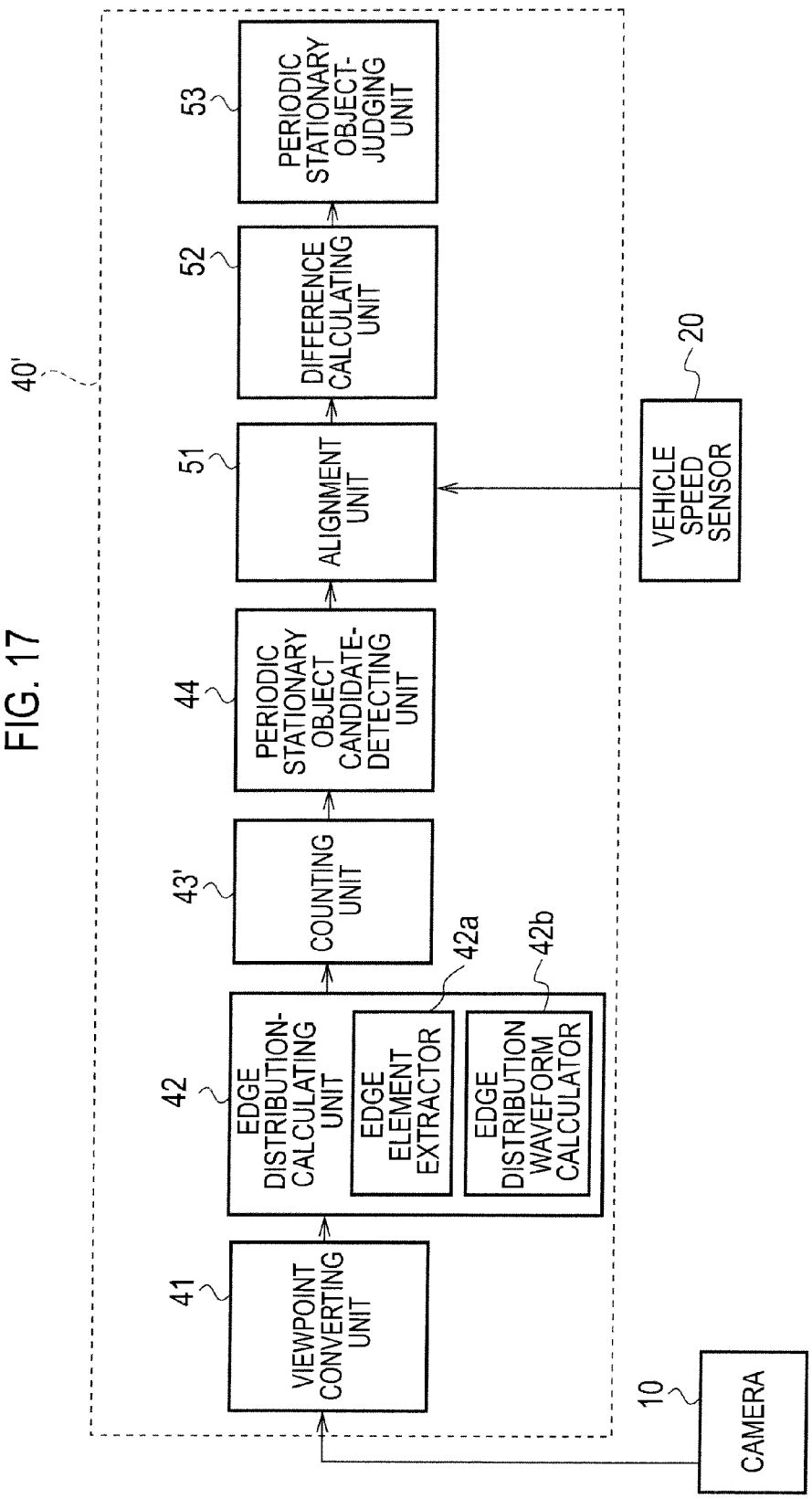
FIG. 17 is a block diagram for illustrating the details of a calculator of a periodic stationary object detection system according to a third embodiment of the present invention.

FIG. 17 is a block diagram for illustrating the details of the calculator 40' according to the present embodiment. As shown in FIG. 17, the calculator 40' includes the viewpoint converting unit 41, the edge distribution-calculating unit 42, a counting unit 43', the periodic stationary object candidate-detecting unit 44, an alignment unit 51, a difference calculating unit 52, and a periodic stationary object-judging unit 53. Note that the calculator 40' is a computer constituted of a CPU, a RAM, a ROM, and so forth. The calculator 40' performs image processing and the like according to a program set in advance to thereby implement the function of each unit such as the viewpoint converting unit 41, the edge distribution-calculating unit 42, the counting unit 43', the periodic stationary object candidate-detecting unit 44, the alignment unit 51, the difference calculating unit 52, and the periodic stationary object-judging unit 53.

The counting unit 43' according to the present embodiment is configured to detect peaks of an edge distribution waveform calculated by the edge distribution-calculating unit 42, and to count the number of the peaks. The counting unit 43' is different from the counting unit 43 according to the second embodiment in that the counting unit 43' counts the number of peaks without excluding peaks having a peak distance out of a predetermined range.

The periodic stationary object candidate-detecting unit 44 is configured to determine whether or not objects corresponding to the peaks are periodic stationary object candidates on the basis of whether or not the number of peaks (peak information) counted by the counting unit 43' is equal to or larger than a predetermined threshold value $Th_3$. Specifically, when the number of peaks counted by the counting unit 43' is equal to or larger than the predetermined threshold value $Th_3$, the periodic stationary object candidate-detecting unit 44 determines that objects corresponding to the peaks are periodic stationary object candidates. The threshold value $Th_3$ is a value determined according to the type of periodic stationary objects to be detected, such as pylons, guardrail posts, or utility poles, for example, and can be obtained through experiments or the like. Specifically, the threshold value $Th_3$ is set to be a value of, for example, 3 to 100 both inclusive.

Figure 18:
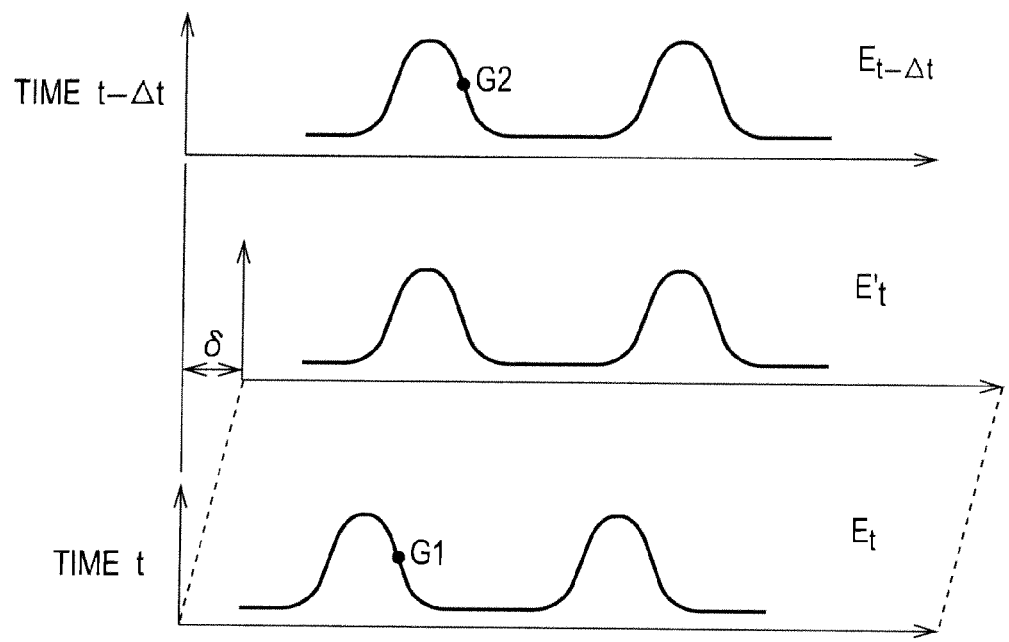
FIG. 18 shows graphs for illustrating detailed operations of an alignment unit in FIG. 17.

FIG. 18 shows graphs for illustrating detailed operations of the alignment unit 51. The alignment unit 51 is configured to sequentially receive edge distribution waveforms calculated by the edge distribution-calculating unit 42, and to align positions of the received edge distribution waveforms at different times on the basis of a traveling speed of the own vehicle V detected by the vehicle speed sensor 20. For example, suppose that the alignment unit 51 receives an edge distribution waveform $E_{t-\Delta t}$ calculated by the edge distribution-calculating unit 42 at time $t-\Delta t$ (second time) and an edge distribution waveform $E_t$ calculated at time $t$ (first time). Moreover, suppose that as the own vehicle V moves during one time segment ($\Delta t$), an edge distribution waveform moves $\delta$ with respect to a coordinate system. In this case, the alignment unit 51 shifts the edge distribution waveform $E_t$ by $\delta$ along the horizontal axis as shown in FIG. 18 to thereby coincide the position of the edge distribution waveform $E_t$ with the position of the edge distribution waveform $E_{t-\Delta t}$. In this manner, the alignment unit 51 obtains an edge distribution waveform $E_t'$. Here, aligning the positions of edge distribution waveforms means when an attention line $L_{ai}$ corresponding to a point (for example, G1) on one edge distribution waveform and an attention line $L_{ai}$ corresponding to a point (for example, G2) on the other edge distribution waveform are present at the same or approximately the same position in an actual space, the edge distribution waveform(s) are moved in parallel in such a manner that the horizontal coordinate values of the point G1 and the point G2 coincide with each other. Incidentally, the length of one time segment ($\Delta t$) may be for example a predetermined time period such as one control cycle, may be an arbitrary time period.

Figure 19:
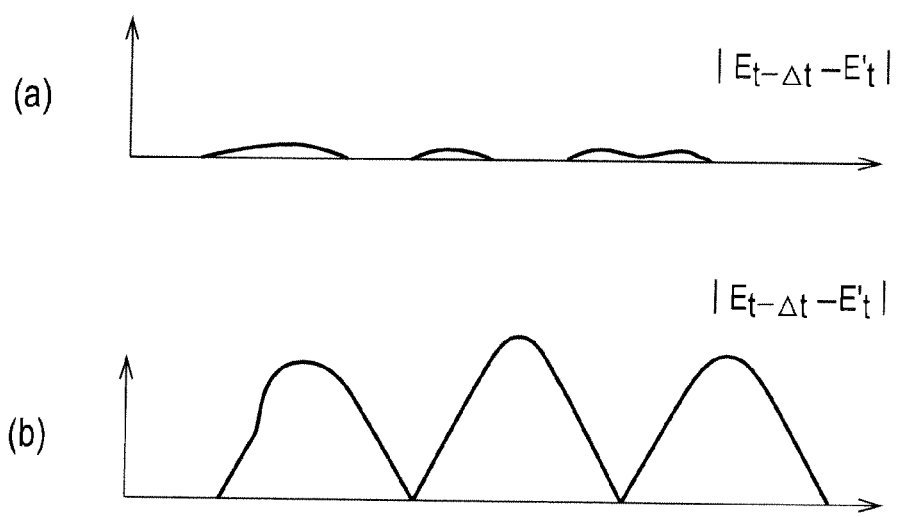
FIG. 19 shows graphs for illustrating detailed operations of a difference calculating unit in FIG. 17. (a) illustrates a difference in a case where an edge distribution waveform is derived from periodic stationary objects, and (b) illustrates a difference in a case where an edge distribution waveform is derived from moving objects.

FIG. 19 shows graphs for illustrating detailed operations of the difference calculating unit 52. The difference calculating unit 52 is configured to receive the edge distribution waveform $E_{t-\Delta t}$ and the edge distribution waveform $E_t'$ calculated by the alignment unit 51, and to calculate a distribution of absolute values of a difference therebetween $|E_{t-\Delta t}-E_t'|$. When the edge distribution waveform is derived from a periodic stationary object, the edge distribution waveform $E_{t-\Delta t}$ well coincides with the edge distribution waveform $E_t'$. Accordingly, the absolute values of the difference $|E_{t-\Delta t}-E_t'|$ are small values overall as shown in FIG. 19(a). Meanwhile, when an edge distribution waveform is derived from moving objects, the edge distribution waveform $E_{t-\Delta t}$ does not coincide with the edge distribution waveform $E_t'$, and the absolute values of the difference $|E_{t-\Delta t}-E_t'|$ greatly change in comparison with FIG. 19(a) as shown in FIG. 19(b).

The periodic stationary object-judging unit 53 is configured to integrate the absolute values $|E_{t-\Delta t}-E_t'|$ calculated by the difference calculating unit 52 to calculate an integrated value $I_{D1}$ (first integrated value) thereof and to calculate an integrated value $I_1$ (second integrated value) of the edge distribution waveform $E_t'$. Further, the periodic stationary object-judging unit 53 is configured to calculate a ratio of the integrated value $I_{D1}$ to the integrated value $I_1$ ($I_{D1}/I_1$), and to determine whether or not a periodic stationary object candidate detected by the periodic stationary object candidate-detecting unit 44 is stationary (stationarity) on the basis of whether or not the value of the ratio is smaller than a predetermined threshold value $Th_4$. The threshold value $Th_4$ is a value determined according to the type of periodic stationary objects to be detected, such as pylons, guardrail posts, or utility poles, for example, and can be obtained through experiments or the like. When the ratio of the integrated value $I_{D1}$ to the integrated value $I_1$ ($I_{D1}/I_1$) is smaller than the predetermined threshold value $Th_4$, the periodic stationary object-judging unit 53 determines that the periodic stationary object candidate is stationary.

When a stationary periodic stationary object candidate is continuously detected for a predetermined time period, the periodic stationary object-judging unit 53 determines that the periodic stationary object candidate is a periodic stationary object. Specifically, when a state where the ratio $I_{D1}/I_1$ is being smaller than the predetermined threshold value $Th_4$ is continuously detected for the predetermined time period, the periodic stationary object-judging unit 53 judges there is a sufficiently high possibility that the detected periodic stationary object candidate is a periodic stationary object. Then, the periodic stationary object-judging unit 53 determines that the objects corresponding to the counted peaks are periodic stationary objects. The "predetermined time period" is a value determined according to the type of periodic stationary objects to be detected, and can be obtained through experiments or the like. The value may be a fixed value, or may vary according to the capturing interval of the camera 10 and the traveling speed of the own vehicle V. Specifically, the "predetermined time period" is set at, for example, 0.1 to 5 seconds. This time period can ensure the reliability of determining that periodic stationary object candidates are periodic stationary objects, and is shorter than an average interval at which an error occurs in measuring the traveling speed of the own vehicle V or the like.

Figure 20:
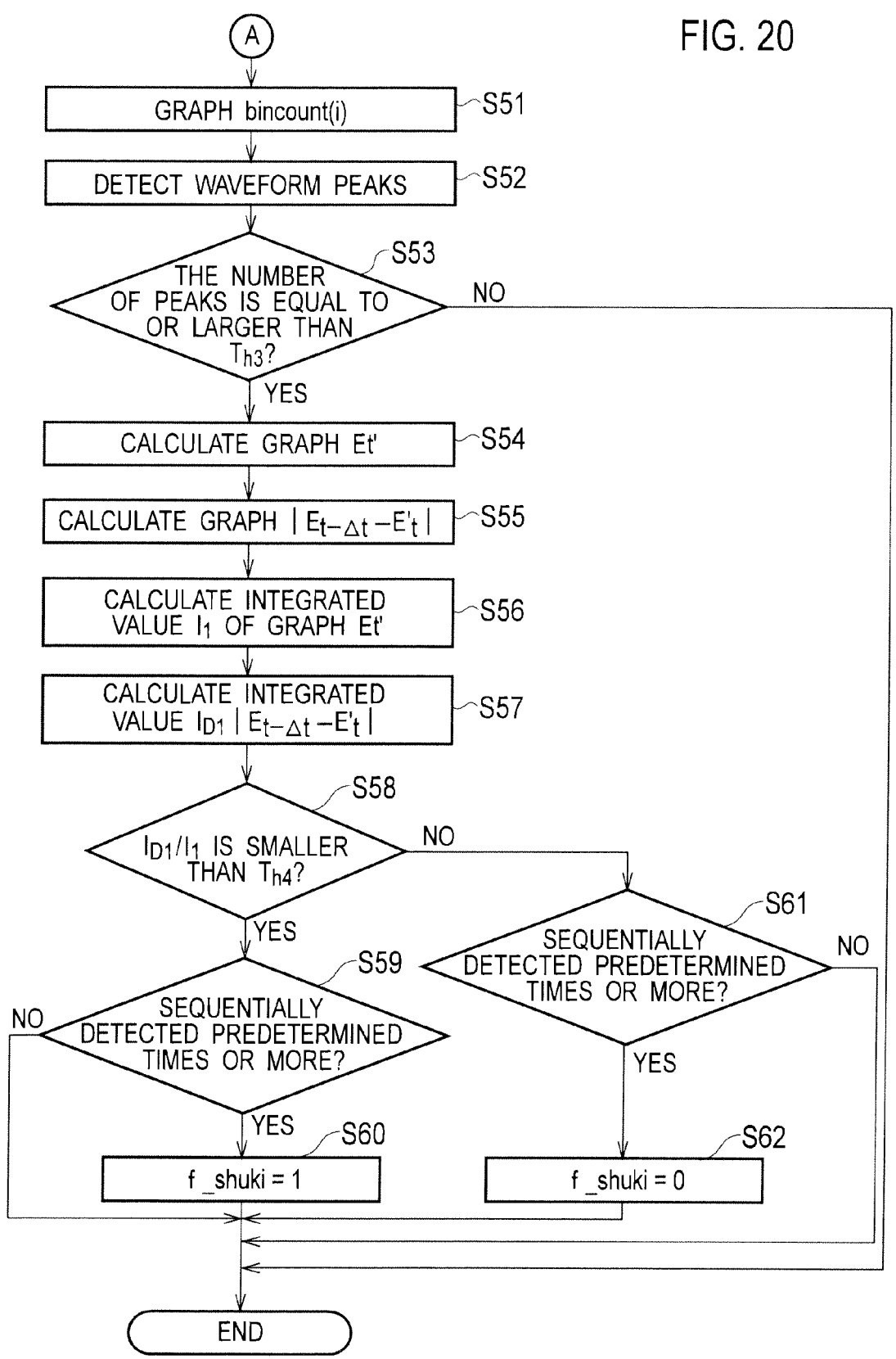
FIG. 20 is a flowchart for illustrating the details of a periodic stationary object detection method according to the third embodiment of the present invention, corresponding to FIG. 16.

Next, a periodic stationary object detection method according to the present embodiment will be described. FIG. 20 is a flowchart for illustrating the details of the periodic stationary object detection method according to the present embodiment, corresponding to FIG. 16 of the second embodiment. Note that since the processing from steps S31 to S41 of the periodic stationary object detection method according to the present embodiment is the same as the processing from steps S31 to S41 of the second embodiment, the illustration and description thereof are omitted. In addition, hereinafter, the description will be given on the processing targeting the detection region $A_1$ for convenience; nevertheless, the same processing can be performed on the detection region $A_2$ as well.

As shown in FIG. 20, in step S51 subsequent to step S41 (see FIG. 15), the edge distribution-calculating unit 42 makes a graph of a count value bincount(i) (i=1 to n) of an edge element obtained for each of n attention lines $L_{ai}$, and obtains an edge distribution waveform. Specifically, the edge distribution-calculating unit 42 plots the count value bincount(i) (i=1 to n) of the edge element on a plane where the vertical axis represents the count value of the edge element, and the horizontal axis represents the position of the attention line $L_{ai}$ on the grounding line $L_1$ in the actual space.

Subsequently, in step S52, the counting unit 43' detects peaks of the edge distribution waveform calculated by the edge distribution-calculating unit 42, and counts the number of the peaks.

Subsequently, in step S53, the periodic stationary object candidate-detecting unit 44 determines whether or not the number of peaks counted by the counting unit 43' is equal to or larger than the predetermined threshold value $Th_3$. When determining that the number of peaks is equal to or larger than the predetermined threshold value $Th_3$, the periodic stationary object candidate-detecting unit 44 detetmines that objects corresponding to the peaks are periodic stationary object candidates, and advances the processing to step S54. In step S53, when determining that the number of peaks counted by the counting unit 43' is smaller than the predetermined threshold value $Th_3$, the processing in FIG. 20 is terminated.

Subsequently, in step S54, the alignment unit 51 aligns positions of edge distribution waveforms at different times received from the edge distribution-calculating unit 42 on the basis of the traveling speed of the own vehicle V detected by the vehicle speed sensor 20. Specifically, when an edge distribution waveform moves δ with respect to the coordinate system of the graph as the own vehicle V moves during one time segment (Δt), the alignment unit 51 shifts the edge distribution waveform $E_t$ by δ along the horizontal axis, and obtains the edge distribution waveform $E_t'$.

Next, in step S55, the difference calculating unit 52 calculates a distribution of the absolute values of the difference $|E_{t-\Delta t}-E_t'|$ between the edge distribution waveform $E_{t-\Delta t}$ and the edge distribution waveform $E_t'$ calculated by the alignment unit 51 therefrom.

Next, the periodic stationary object judging unit 53 calculates the integrated value $I_1$ of the edge distribution waveform $E_t'$ in step S56, and calculates the integrated value $I_{D1}$ of the absolute values $|E_{t-\Delta t}-E_t'|$ in subsequent step S57.

Next, in step S58, the periodic stationary object-judging unit 53 calculates the ratio $(I_{D1}/I_1)$ of the integrated value $I_{D1}$ to the integrated value $I_1$, and determines whether or not the periodic stationary object candidate detected by the periodic stationary object candidate-detecting unit 44 is stationary on the basis of whether or not the value of the ratio is smaller than the predetermined threshold value $Th_4$. When determining that the ratio $I_{D1}/I_1$ is smaller than the predetermined threshold value $Th_4$, the periodic stationary object-judging unit 53 determines that the periodic stationary object candidate is stationary, and advances the processing to step S59.

In step S59, the periodic stationary object-judging unit 53 judges whether or not the state where the ratio $I_{D1}/I_1$ is being smaller than the predetermined threshold value $Th_4$ is sequentially detected the predetermined times or more, in other words, whether or not the state is continuously detected for the predetermined time period. When judging that the state where the ratio $I_D/I_1$ is being smaller than the predetermined threshold value $Th_4$ is sequentially detected the predetermined times or more, the periodic stationary object judging unit 53 judges that the objects corresponding to the counted peaks are periodic stationary objects, and substitutes "1" for the flag f_shuki in step S60. Meanwhile, in step S59, when judging that the state where the ratio $I_D/I_1$ is being smaller than the predetermined threshold value $Th_4$ is not sequentially detected the predetermined times or more, the periodic stationary object judging unit 53 skips step S60 and maintains the value of the flag f_shuki. Thereafter, the processing in FIG. 20 is terminated.

In step S58, when determining that the ratio $I_{D1}/I_1$ is equal to or larger than the predetermined threshold value $Th_4$, the periodic stationary object-judging unit 53 advances the processing to step S61.

In step S61, the periodic stationary object-judging unit 53 judges whether or not the state where the ratio $I_{D1}/I_1$ is being equal to or larger than the predetermined threshold value $Th_4$ is sequentially detected the predetermined times or more. When judging the state where the ratio $I_{D1}/I_1$ is being equal to or larger than the predetermined threshold value $Th_4$ is sequentially detected the predetermined times or more, the periodic stationary object-judging unit 53 judges that the objects corresponding to the counted peaks are not periodic stationary objects, and substitutes"0" for the flag f_shuki in step S62. Meanwhile, in step S61, when judging that the state where being the ratio $I_{D1}/I_1$ is equal to or larger than the predetermined threshold value $Th_4$ is not sequentially detected the predetermined times or more, the periodic stationary object-judging unit 53 skips step S62, and maintains the value of the flag f_shuki. Thereafter, the processing in FIG. 20 is terminated.

In the periodic stationary object detection system 3 and the periodic stationary object detection method according to the present embodiment, an edge element (feature point) of a three-dimensional object is extracted from image data on a predetermined region of a bird's eye view image for each of regions (sub regions) near multiple vertical virtual lines included in the predetermined region; an edge distribution waveform (waveform data) corresponding to a distribution of the edge elements in the predetermined region is calculated; and whether or not the three-dimensional object having the extracted edge element is a periodic stationary object candidate is judged on the basis of whether or not the number of peaks (peak information) of the edge distribution waveform is equal to or larger than a predetermined threshold value. This, similarly to the first embodiment and the second embodiment, enables more clear extraction of the periodicity (repeatability) of periodic stationary objects as the peak information of the waveform data, and periodic stationary object candidates can be more easily extracted from three-dimensional objects included in a captured image. Thereby, more precise extraction of periodic stationary objects is possible.

Moreover, in the periodic stationary object detection system 3 and the periodic stationary object detection method according to the present embodiment, similarly to the second embodiment, the number of edge elements present along each of multiple vertical virtual lines extending in the vertical direction in an actual space is summed, and an edge distribution waveform is obtained on the basis of the number of edge elements thus summed. Moreover, when the number of peaks of the edge distribution waveform is equal to or larger than the predetermined threshold value $Th_3$, it is determined that the three-dimensional object having the extracted edge element is a periodic stationary object candidate. Hence, similarly to the second embodiment, a case where edges extending in the vertical direction are highly densely aligned is surely detected without determining that the detected three-dimensional objects are stationary objects or moving objects. Thus, it is made possible to more easily detect periodic stationary object candidates which are more likely to be periodic stationary objects.

Further, in the periodic stationary object detection system 3 and the periodic stationary object detection method according to the present embodiment, the position of the edge distribution waveform $E_t$ at the time t is aligned with the position of the edge distribution waveform $E_{t-\Delta t}$ at the time t–Δt on the basis of the traveling speed of a moving object, and the difference distribution waveform $|E_{t-\Delta t}-E_t'|$ between the edge distribution waveform $E_{t-\Delta t}$ at the time t–Δt and the edge distribution waveform $E_t'$ thus aligned is calculated. Then, this difference distribution waveform $|E_{t-\Delta t}-E_t'|$ is integrated to calculate the integrated value $I_{D1}$, and the aligned edge distribution waveform $E_t'$ is integrated to calculate the integrated value $I_1$. The ratio of the integrated value $I_{D1}$ to the integrated value $I_1$ ($I_{D1}/I_1$) is calculated, and whether or not the periodic stationary object candidate is stationary is determined on the basis of whether or not the value of the ratio is smaller than the predetermined threshold value $Th_4$. Hence, it is possible to detect stationary periodic stationary object candidates which are further likely to be periodic stationary objects, and periodic stationary objects can be further easily and surely detected.

Furthermore, in the periodic stationary object detection system 3 and the periodic stationary object detection method according to the present embodiment, when it is continuously detected for a predetermined time period that a periodic stationary object candidate is stationary, it is determined that the periodic stationary object candidate is a periodic stationary object. Hence, erroneous detection due to noise is prevented, and periodic stationary objects can be more reliably detected.

Modified Example

In the third embodiment above, the ratio of the integrated value $I_{D1}$ to the integrated value $I_1$ ($I_{D1}/I_1$) is calculated, and whether or not a periodic stationary object candidate is stationary is determined on the basis of whether or not the value of the ratio is smaller than the predetermined threshold value $Th_4$. Nevertheless, the determination method is not limited thereto.

In this modified example, the difference calculating unit 52 is configured to calculate the distribution of the absolute values of the difference (first difference) $|E_{t-\Delta t}-E_t'|$ between the edge distribution waveform $E_t'$ and the edge distribution waveform $E_{t-\Delta t}$ and to calculate a distribution of absolute values of a difference (second difference) $|E_{t-\Delta t}-E_t|$ between the edge distribution waveform $E_t$ and the edge distribution waveform $E_{t-\Delta t}$.

Moreover, the periodic stationary object-judging unit 53 is configured to integrate the absolute values $|E_{t-\Delta t}-E_t'|$ calculated by the difference calculating unit 52 to calculate the integrated value $I_{D1}$ (first integrated value) thereof, and to integrate the absolute values $|E_{t-\Delta t}-E_t|$ to calculate an integrated value $I_{D2}$ (second integrated value) thereof.

Further, the periodic stationary object-judging unit 53 is configured to calculate a ratio of the integrated value $I_{D1}$ to the integrated value $I_{D2}$ ($I_{D1}/I_{D2}$), and to determine whether or not a periodic stationary object candidate detected by the periodic stationary object candidate-detecting unit 44 is stationary on the basis of whether or not the value of the ratio is smaller than a predetermined threshold value $Th_5$. The threshold value $Th_5$ is a value determined according to the type of periodic stationary objects to be detected, such as pylons, guardrail posts, or utility poles, for example, and can be obtained through experiments or the like. When the ratio of the integrated value $I_{D1}$ to the integrated value $I_{D2}$ ($I_{D1}/I_{D2}$) is smaller than the predetermined threshold value $Th_5$, the periodic stationary object-judging unit 53 determines that the periodic stationary object candidate is stationary.

When a stationary periodic stationary object candidate is continuously detected for a predetermined time period, the periodic stationary object-judging unit 53 determines that the periodic stationary object candidate is a periodic stationary object. Specifically, when a state where the ratio $I_{D1}/I_{D2}$ is being smaller than the predetermined threshold value $Th_4$ is continuously detected for the predetermined time period, the periodic stationary object-judging unit 53 judges there is a sufficiently high possibility that the detected periodic stationary object candidate is a periodic stationary object. Then, the periodic stationary object-judging unit 53 determines that the objects corresponding to the counted peaks are periodic stationary objects.

Figure 21:
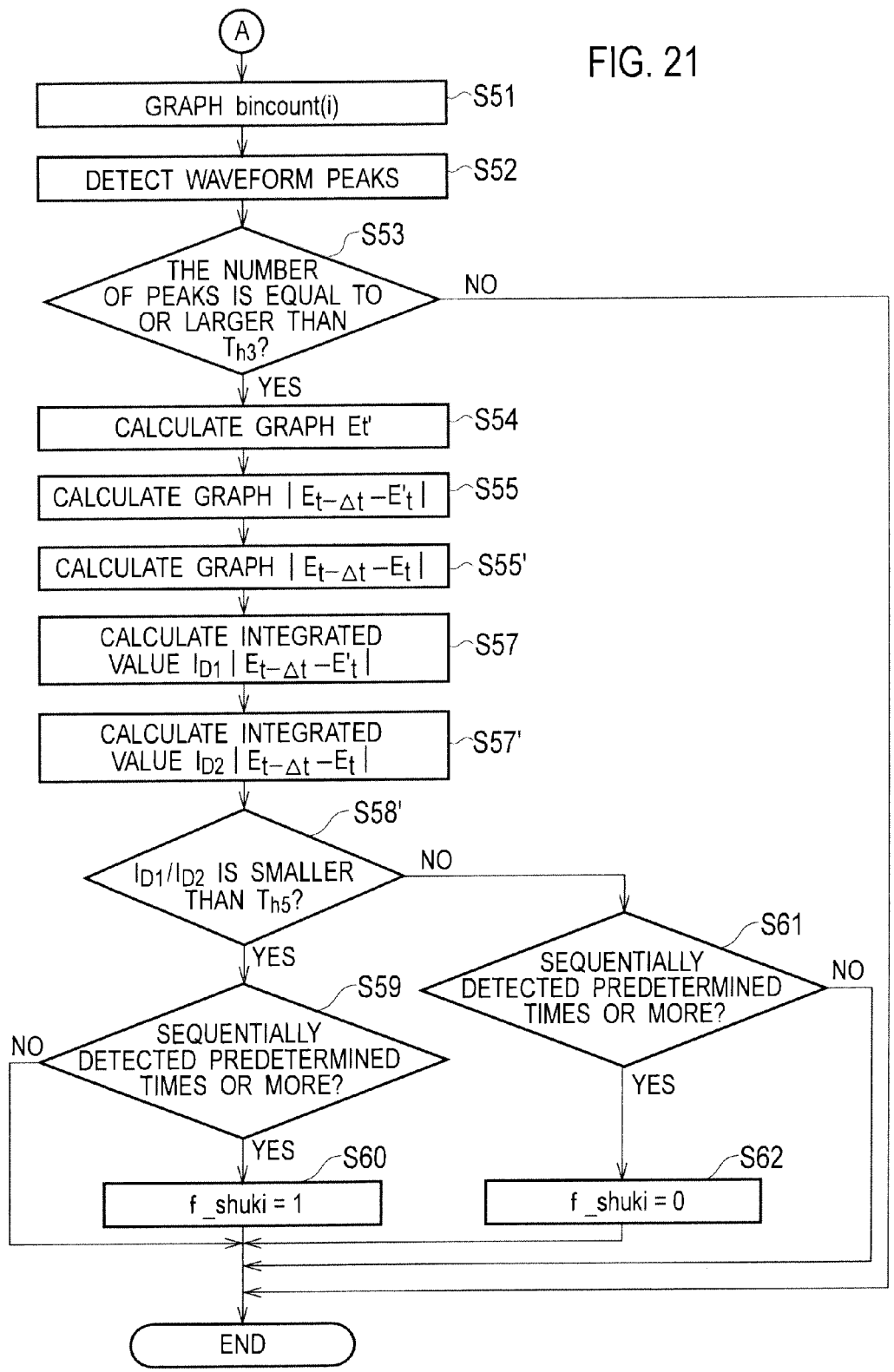
FIG. 21 is a flowchart for illustrating the details of a periodic stationary object detection method according to a modified example of the third embodiment of the present invention, corresponding to FIG. 16.

Next, a periodic stationary object detection method according to this modified example will be described. FIG. 21 is a flowchart for illustrating the details of the periodic stationary object detection method according to this modified example, corresponding to FIGS. 16 and 20. Note that since the processing from steps S31 to S41 of the periodic stationary object detection method according to this modified example is the same as the processing from steps S31 to S41 of the above-described embodiment, the illustration and description thereof are omitted. In addition, in the periodic stationary object detection method according to this modified example, the processing equivalent to the processing described in the second and the third embodiments is denoted by the same reference signs, and the description thereof is omitted.

In this modified example, as shown in FIG. 21, in step S55' subsequent to step S55, the periodic stationary object-judging unit 53 calculates a distribution of the absolute values of the difference $|E_{t-\Delta t}-E_t|$ between the edge distribution waveform $E_{t-\Delta t}$ and the edge distribution waveform $E_t$ calculated by the alignment unit 51 therefrom.

Next, the periodic stationary object-judging unit 53 calculates the integrated value $I_{D1}$ of the absolute values $|E_{t-\Delta t}-E_t'|$ in step S57, and calculates the integrated value $I_{D2}$ of the absolute values $|E_{t-\Delta t}-E_t|$ in subsequently step S57'.

Next, in step S58', the periodic stationary object-judging unit 53 calculates the ratio of the integrated value $I_{D1}$ to the integrated value $I_{D2}$ ($I_{D1}/I_{D2}$), and determines whether or not a periodic stationary object candidate detected by the periodic stationary object candidate-detecting unit 44 is stationary on the basis of whether or not the value of the ratio is smaller than the predetermined threshold value $Th_5$. When determining that the ratio $I_{D1}/I_{D2}$ is smaller than the predetermined threshold value $Th_5$, the periodic stationary object-judging unit 53 determines that the periodic stationary object candidate is stationary, and advances the processing to step S59. Meanwhile, in step S58, when determining that $I_{D1}/I_{D2}$ is equal to or larger than the predetermined threshold value $Th_5$, the periodic stationary object-judging unit 53 advances the processing to step S61.

The processing after step S59 and the processing after step S61 are the same as those in the third embodiment, and the description thereof is omitted.

In this modified example, the first difference distribution waveform $|E_{t-\Delta t}-E_t'|$ between the edge distribution waveform $E_{t-\Delta t}$ at the time $t-\Delta t$ and the edge distribution waveform $E_t'$ thus aligned and the second difference distribution waveform $|E_{t-\Delta t}-E_t|$ between the edge distribution waveform $E_t$ at the time $t$ and the edge distribution waveform $E_{t-\Delta t}$ at the time $t-\Delta t$ are calculated. Then, the first difference distribution waveform $|E_{t-\Delta t}-E_t'|$ is integrated to calculate the integrated value $I_{D1}$, and the second difference distribution waveform $|E_{t-\Delta t}-E_t|$ is integrated to calculate the integrated value $I_{D2}$. The ratio of the integrated value $I_{D1}$ to the integrated value $I_{D2}$ ($I_{D1}/I_{D2}$) is calculated, and whether or not the periodic stationary object candidate is stationary is determined on the basis of whether or not the value of the ratio is smaller than the predetermined threshold value $Th_5$. Since the denominator of the ratio is the integrated value $I_{D2}$ of the difference between the edge distribution waveform $E_t$ at the time $t$ and the edge distribution waveform $E_{t-\Delta t}$ at the time $t-\Delta t$, this makes more significant a difference between a value of the ratio obtained when the edge distribution waveforms $E_t$, $E_{t-\Delta t}$ are derived from moving objects and a value of the ratio obtained when derived from periodic stationary objects, and stationary periodic stationary object candidates can be more surely detected.

Note that, in the third embodiment and the modified example, what is compared with the predetermined threshold values in determining whether or not a periodic stationary object candidate is stationary is not limited to the ratio $I_{D1}/I_1$ and the ratio $I_{D1}/I_{D2}$. The ratio may be, for example, a ratio of the integrated value $I_{D1}$ to an integrated value $I_2$ of the edge distribution waveform $E_t$ ($I_{D1}/I_2$) or a ratio of the integrated value $I_{D1}$ to an integrated value $I_3$ of the edge distribution waveform $E_{t-\Delta t}$ calculated at the time $t-\Delta t$ ($I_{D1}/I_3$).

Moreover, all of the integrated values $I_1$, $I_2$, $I_3$, $I_{D1}$, $I_{D2}$ constituting the denominators and the numerators of the above ratios are obtained by integrating edge distribution waveforms or absolute values of a difference thereof, but may be one obtained by integrating a waveform, which results from squaring the value of edge distribution waveforms or a difference thereof.

Hereinabove, the embodiments of the present invention have been described. However, these embodiments are merely examples described to facilitate the understanding of the present invention, and the present invention is not limited to the embodiments. The technical scope of the present invention includes not only the specific technical matters disclosed in the above embodiments, but also various modifications, variations, alternative techniques, and the like, which can be developed readily therefrom.

For example, in the above embodiments, the vehicle speed of the own vehicle V is determined on the basis of a signal from vehicle speed sensor 20. Nevertheless, without limitation to this, the speed may be estimated from multiple images at different times. In this case, the vehicle speed sensor is no longer necessary, and the configuration can be simplified.

This application claims priority based on Japanese Patent Application No. 2011-034097 filed on Feb. 21, 2011, the entire content of which is incorporated herein by reference.

INDUSTRIAL APPLICABILITY

In a periodic stationary object detection system and a periodic stationary object detection method according to the present invention, a feature point of three-dimensional object is extracted from image data on a predetermined region of a bird's eye view image respectively for multiple sub regions included in the predetermined region; waveform data corresponding to a distribution of the feature point in the predetermined region on the bird's eye view image is calculated; and whether or not the three-dimensional object having the extracted feature point is a periodic stationary object candidate is judged on the basis of whether or not peak information of the waveform data is equal to or larger than a predetermined threshold value. This enables more clear extraction of the periodicity (repeatability) of periodic stationary objects as the peak information of the waveform data, and periodic stationary object candidates can be more easily extracted from three-dimensional objects included in a captured image. Thereby, more precise extraction of periodic stationary objects is possible.

REFERENCE SIGNS LIST 1, 2, 3 periodic stationary object detection system
10 camera (image-capturing device)
20 vehicle speed sensor (speed detector)
30, 40 calculator
31, 41 viewpoint converting unit
32, 51 alignment unit
33 three-dimensional object detecting unit
34 travel amount candidate-calculating unit
35, 43 counting unit
36 travel range-calculating unit
37, 45, 53 periodic stationary object-judging unit
37a periodic stationary object candidate-detecting unit
37b periodicity determining unit
38 lane change-detecting unit (lateral movement-detecting unit)
42 edge distribution-calculating unit
44 periodic stationary object candidate-detecting unit
52 difference calculating unit
a view angle
$PB_t$ bird's eye view image
$PD_t$ difference image
V own vehicle

The invention claimed is:

1. A periodic stationary object detection system for detecting a periodic stationary object in surroundings of a moving object, comprising:
   an image-capturing device mounted on the moving object and capable of capturing an image of the surroundings of the moving object;

a viewpoint converting unit configured to perform viewpoint conversion on the image captured by the image-capturing device to create a bird's eye view image;

a feature point-extracting unit configured to extract a feature point of a three-dimensional object from image data on a predetermined region of the bird's eye view image for each of a plurality of sub regions included in the predetermined region;

a waveform data-calculating unit configured to calculate waveform data corresponding to a distribution of the feature points extracted by the feature point-extracting unit in the predetermined region on the bird's eye view image;

a peak information detecting unit configured to detect peak information of the waveform data;

a periodic stationary object candidate-detecting unit configured to judge whether or not the three-dimensional object having the feature point extracted by the feature point-extracting unit is a periodic stationary object candidate on a basis of whether or not the peak information is equal to or larger than a predetermined first threshold value; and a periodic stationary object judging unit configured to determine that the periodic stationary object candidate is a periodic stationary object when the periodic stationary object candidate is detected by the periodic stationary object candidate-detecting unit and the detection is made under a predetermined condition.

2. The periodic stationary object detection system according to claim 1, wherein the feature point-extracting unit extracts edge elements present along each of a plurality of vertical virtual lines extending in a vertical direction in an actual space, the waveform data-calculating unit sums the number of the edge elements extracted by the feature point-extracting unit for each of the plurality of vertical virtual lines, and calculates an edge distribution waveform on a basis of the number of the edge elements thus summed, the peak information detecting unit is a counting unit configured to detect peaks of the edge distribution waveform calculated by the waveform data-calculating unit, and to count the number of the peaks thus detected, and the periodic stationary object candidate-detecting unit determines that the three-dimensional object having the feature point extracted by the feature point-extracting unit is a periodic stationary object candidate when the number of the peaks counted by the counting unit is equal to or larger than a predetermined second threshold value.

3. The periodic stationary object detection system according to claim 2, wherein the counting unit detects peaks of the edge distribution waveform calculated by the waveform data-calculating unit, and counts the number of peaks aligned at equal intervals among the peaks thus detected.

4. The periodic stationary object detection system according to claim 1, wherein the periodic stationary object judging unit determines that the periodic stationary object candidate is a periodic stationary object when the periodic stationary object candidate is continuously detected for a predetermined time period.

5. The periodic stationary object detection system according to claim 2, further comprising:

a speed detector configured to detect a traveling speed of the moving object;

an alignment unit configured to align a position of an edge distribution waveform at a first time calculated by the waveform data-calculating unit with a position of an edge distribution waveform at a second time different from the first time on a basis of the traveling speed detected by the speed detector; and a difference calculating unit configured to calculate a difference distribution waveform between the edge distribution waveform at the second time and the edge distribution waveform aligned by the alignment unit, wherein the periodic stationary object judging unit integrates the difference distribution waveform calculated by the difference calculating unit to calculate a first integrated value, integrates any one of the edge distribution waveform at the first time, the edge distribution waveform at the second time, and the edge distribution waveform aligned by the alignment unit to calculate a second integrated value, calculates a ratio of the first integrated value to the second integrated value, and determines whether or not the periodic stationary object candidate is stationary on a basis of whether or not a value of the ratio is smaller than a predetermined third threshold value.

6. The periodic stationary object detection system according to claim 2, further comprising:

a speed detector configured to detect a traveling speed of the moving object;

an alignment unit configured to align a position of an edge distribution waveform at a first time calculated by the waveform data-calculating unit with a position of an edge distribution waveform at a second time different from the first time on a basis of the traveling speed detected by the speed detector; and a difference calculating unit configured to calculate a first difference distribution waveform between the edge distribution waveform at the second time and the edge distribution waveform aligned by the alignment unit, and a second difference distribution waveform between the edge distribution waveform at the first time and the edge distribution waveform at the second time, wherein the periodic stationary object-judging unit integrates the first difference distribution waveform to calculate a first integrated value, integrates the second difference distribution waveform to calculate a second integrated value, calculates a ratio of the first integrated value to the second integrated value, and determines whether or not the periodic stationary object candidate is stationary on a basis of whether or not a value of the ratio is smaller than a predetermined fourth threshold value.

7. The periodic stationary object detection system according to claim 5, wherein the periodic stationary object judging unit determines that the periodic stationary object candidate is a periodic stationary object when continuously detecting that the periodic stationary object candidate is stationary for a predetermined time period.

8. The periodic stationary object detection system according to claim 1, further comprising:

a speed detector configured to detect a traveling speed of the moving object; and a travel range-calculating unit configured to calculate a travel range of periodic stationary objects on the bird's eye view image on a basis of a capturing interval of the image-capturing device and the traveling speed detected by the speed detector, wherein the feature point-extracting unit includes:
an alignment unit configured to align positions of image data at different times created by the viewpoint converting unit;
a three-dimensional object detecting unit configured to detect a plurality of three-dimensional objects on a basis of data on a difference image of the image data at the different times aligned by the alignment unit; and
a travel amount candidate-calculating unit configured to calculate travel amount candidates of the plurality of three-dimensional objects detected by the three-dimensional object detecting unit,
the waveform data-calculating unit includes a counting unit configured to count the travel amount candidates calculated by the travel amount candidate-calculating unit and to generate a histogram as the waveform data,
when values of peaks of the histogram generated by the counting unit are equal to or larger than a predetermined fifth threshold value, the periodic stationary object candidate-detecting unit determines that the three-dimensional objects linked to travel amount candidates corresponding to the peaks are periodic stationary object candidates, and
the periodic stationary object-judging unit judges that the periodic stationary object candidates are periodic stationary objects when the peaks of the histogram are present within the travel range calculated by the travel range-calculating unit.

9. The periodic stationary object detection system according to claim 8, wherein the travel amount candidate-calculating unit calculates a plurality of the travel amount candidates for each of the three-dimensional objects.

10. The periodic stationary object detection system according to claim 8, wherein the periodic stationary object candidate-detecting unit sets the predetermined fifth threshold value obtained from a maximum value of the peaks.

11. The periodic stationary object detection system according to claim 8, further comprising a periodicity determining unit configured to judge if there is a periodicity from positions where the peaks appear, and to lower the predetermined fifth threshold value when judging that there is a periodicity.

12. The periodic stationary object detection system according to claim 11, wherein the periodicity determining unit judges if there is a periodicity from positions where peaks appear, the peaks having values equal to or larger than the predetermined fifth threshold value set from the maximum value of the peaks.

13. The periodic stationary object detection system according to claim 11, further comprising a lateral movement-detecting unit configured to detect a lateral movement of the moving object, and
when the lateral movement-detecting unit detects a lateral movement of a specified distance or longer and the predetermined fifth threshold value has been lowered, the periodicity determining unit initializes the lowered fifth threshold value.

14. The periodic stationary object detection system according to claim 8, wherein
the periodic stationary object-judging unit
stores positions where peaks appear and peak values thereof when it is judged that there is a periodicity in previous processing,
judges that the periodic stationary object candidates are periodic stationary objects in a case of detecting a peak having a peak value equal to or larger than the predetermined fifth threshold value other than the peaks judged to have a periodicity in current processing, when an average value of the peak values judged to have the periodicity in the current processing is not smaller than an average value of the peak values judged to have the periodicity in the previous processing by a predetermined value or larger, and
judges that moving objects are present when the average value of the peak values judged to have the periodicity in the current processing is smaller than the average value of the peak values judged to have the periodicity in the previous processing by the predetermined value or larger.

15. A periodic stationary object detection method for detecting periodic stationary objects in surrounding of a moving object, comprising:
an image-capturing step of capturing an image of the surroundings of the moving object using an image-capturing device mounted on the moving object;
a viewpoint converting step of performing viewpoint conversion on the image captured by the image-capturing device to create a bird's eye view image;
a feature point-extracting step of extracting a feature point of a three-dimensional object from image data on a predetermined region of the bird's eye view image for each of a plurality of sub regions included in the predetermined region;
a waveform data-calculation step of calculating waveform data corresponding to a distribution of the feature points extracted in the feature point-extracting step in the predetermined region on the bird's eye view image;
a peak information-detecting step of detecting peak information of the waveform data;
a periodic stationary object candidate-detecting step of judging whether or not the three-dimensional object having the feature point extracted in the feature point-extracting step is a periodic stationary object candidate on a basis of whether or not the peak information is equal to or larger than a predetermined first threshold value; and
a periodic stationary object-judging step of determining that the periodic stationary object candidate is a periodic stationary object when the periodic stationary object candidate is detected in the periodic stationary object candidate-detecting step and the detection is made under a predetermined condition.

16. A periodic stationary object detection system for detecting a periodic stationary object in surroundings of a moving object, comprising:
image-capturing means for capturing an image of the surroundings of the moving object, the image-capturing means being mounted on the moving object;
viewpoint converting means for performing viewpoint conversion on the image captured by the image-capturing means to create a bird's eye view image;
feature point-extracting means for extracting a feature point of a three-dimensional object from image data on a predetermined region of the bird's eye view image for each of a plurality of sub regions included in the predetermined region;
waveform data-calculating means for calculating waveform data corresponding to a distribution of the feature points extracted by the feature point-extracting means in the predetermined region on the bird's eye view image;
peak information detecting means for detecting peak information of the waveform data;
periodic stationary object candidate-detecting means for judging whether or not the three-dimensional object having the feature point extracted by the feature point-extracting means is a periodic stationary object candidate on a basis of whether or not the peak information is equal to or larger than a predetermined first threshold value; and
periodic stationary object judging means for determining that the periodic stationary object candidate is a periodic stationary object when the periodic stationary object candidate is detected by the periodic stationary object candidate-detecting means and the detection is made under a predetermined condition.

* * * * *